United States Patent
Hearty et al.

(10) Patent No.: US 12,223,516 B2
(45) Date of Patent: Feb. 11, 2025

(54) MULTI-PAGE ONLINE APPLICATION ORIGINATION (OAO) SERVICE FOR FRAUD PREVENTION SYSTEMS

(71) Applicant: Mastercard Technologies Canada ULC, Vancouver (CA)

(72) Inventors: John Hearty, Vancouver (CA); Anton Laptiev, Vancouver (CA); Hanhan Wu, Surrey (CA); Carrie Ka Lai Cheung, Burnaby (CA); Igor Opushnyev, New Westminster (CA); Sik Suen Chan, Richmond (CA); Parin Prashant Shah, Vancouver (CA)

(73) Assignee: Mastercard Technologies Canada ULC, Vancouver (CA)

( * ) Notice: Subject to any disclaimer, the term of this patent is extended or adjusted under 35 U.S.C. 154(b) by 0 days.

(21) Appl. No.: 16/804,725

(22) Filed: Feb. 28, 2020

(65) Prior Publication Data

US 2020/0279266 A1    Sep. 3, 2020

Related U.S. Application Data

(60) Provisional application No. 62/812,749, filed on Mar. 1, 2019, provisional application No. 62/976,026, filed on Feb. 13, 2020.

(51) Int. Cl.
G06Q 30/018    (2023.01)
G06F 11/30    (2006.01)
(Continued)

(52) U.S. Cl.
CPC ....... *G06Q 30/0185* (2013.01); *G06F 11/302* (2013.01); *G06F 11/3438* (2013.01);
(Continued)

(58) Field of Classification Search
CPC ......... G06Q 20/4016; G06Q 20/40145; G06Q 20/4093; G06Q 20/4097; G06Q 20/027;
(Continued)

(56) References Cited

U.S. PATENT DOCUMENTS 7,458,508 B1    12/2008  Shao et al.
8,953,729 B1     2/2015  Artless et al.
(Continued)

OTHER PUBLICATIONS

O. Salem, A. Hossain and M. Kamala, "Awareness Program and AI based Tool to Reduce Risk of Phishing Attacks," 2010 10th IEEE International Conference on Computer and Information Technology, Bradford, UK, 2010, pp. 1418-1423, doi: 10.1109/CIT.2010.254. (Year: 2010).*
(Continued)

*Primary Examiner* — David P Sharvin
*Assistant Examiner* — Steven R Chism
(74) *Attorney, Agent, or Firm* — Michael Best & Friedrich LLP

(57) ABSTRACT

A fraud prevention system that includes a fraud prevention server including an electronic processor and a memory. The memory includes an online application origination (OAO) service. When executing the OAO service, the electronic processor is configured to determine whether the OAO service is enabled and whether a website configuration includes a list of multi-page placements for an online application, determine that input data needs to be stored in the memory and combined into multi-page input data, determine a fraud risk score of the online application based on the multi-page input data and an online application origination (OAO) model that differentiates between a behavior of a normal user and a behavior of a nefarious actor during a submission of the online application on a device, and control a client server to approve, hold, or deny the online application based on the fraud risk score that is determined.

17 Claims, 12 Drawing Sheets

(51) Int. Cl.

| | | |
|---|---|---|
| *G06F 11/34* | (2006.01) | |
| *G06F 21/31* | (2013.01) | |
| *G06F 21/55* | (2013.01) | |
| *G06Q 10/10* | (2023.01) | |
| *G06Q 20/02* | (2012.01) | |
| *G06Q 20/40* | (2012.01) | |
| *G06Q 40/03* | (2023.01) | |
| *G06Q 50/26* | (2024.01) | |
| *H04L 9/40* | (2022.01) | |
| *H04L 67/50* | (2022.01) | |

(52) U.S. Cl.
CPC .......... *G06F 21/316* (2013.01); *G06F 21/554* (2013.01); *G06Q 10/10* (2013.01); *G06Q 20/027* (2013.01); *G06Q 20/40145* (2013.01); *G06Q 20/4016* (2013.01); *G06Q 20/4093* (2013.01); *G06Q 20/4097* (2013.01); *G06Q 40/03* (2023.01); *G06Q 50/265* (2013.01); *H04L 63/1425* (2013.01); *H04L 63/1433* (2013.01); *H04L 67/535* (2022.05)

(58) Field of Classification Search
CPC .. G06Q 30/0185; G06Q 40/025; G06Q 10/10; G06F 11/302; G06F 11/3438; H04L 63/1425; H04L 63/1433; H04L 67/22
See application file for complete search history.

(56) References Cited

U.S. PATENT DOCUMENTS

| | | | |
|---|---|---|---|
| 9,646,322 B2* | 5/2017 | Minnis .................. G06Q 30/02 |
| 10,282,728 B2 | 5/2019 | Avegliano et al. |
| 10,290,053 B2 | 5/2019 | Priess et al. |
| 10,382,466 B2 | 8/2019 | Ostergaard |
| 10,410,140 B1 | 9/2019 | Nair |
| 10,574,683 B1 | 2/2020 | Ghosh et al. |
| 10,832,248 B1 | 11/2020 | Kramme et al. |
| 10,846,434 B1 | 11/2020 | Ben-Zvi et al. |
| 10,867,303 B1 | 12/2020 | Manapat et al. |
| 11,012,454 B1 | 5/2021 | Han et al. |
| 11,025,638 B2 | 6/2021 | Ford et al. |
| 11,151,468 B1 | 10/2021 | Chen et al. |
| 11,200,324 B1 | 12/2021 | Manral |
| 11,250,435 B2 | 2/2022 | Turgeman et al. |
| 11,250,444 B2 | 2/2022 | Yao et al. |
| 2002/0099649 A1 | 7/2002 | Lee et al. |
| 2003/0069857 A1 | 4/2003 | Junda |
| 2004/0153663 A1 | 8/2004 | Clark et al. |
| 2004/0221171 A1* | 11/2004 | Ahmed ................ G06F 21/316 726/23 |
| 2005/0039036 A1 | 2/2005 | Eisen |
| 2005/0154676 A1* | 7/2005 | Ronning ............ G06Q 20/3674 705/44 |
| 2006/0149580 A1 | 7/2006 | Helsper et al. |
| 2006/0161403 A1 | 7/2006 | Jiang et al. |
| 2006/0271457 A1 | 11/2006 | Romain et al. |
| 2007/0112667 A1 | 5/2007 | Rucker |
| 2007/0239604 A1 | 10/2007 | O'Connell et al. |
| 2007/0244808 A1 | 10/2007 | Eze |
| 2007/0261112 A1 | 11/2007 | Todd et al. |
| 2008/0086759 A1 | 4/2008 | Colson |
| 2009/0089869 A1 | 4/2009 | Varghese |
| 2009/0099959 A1 | 4/2009 | Liao et al. |
| 2009/0248600 A1 | 10/2009 | Kennel |
| 2010/0036672 A1 | 2/2010 | Li et al. |
| 2010/0094767 A1 | 4/2010 | Miltonberger |
| 2010/0094768 A1 | 4/2010 | Miltonberger |
| 2010/0293090 A1 | 11/2010 | Domenikos et al. |
| 2010/0293094 A1 | 11/2010 | Kolkowitz et al. |
| 2011/0251823 A1 | 10/2011 | Davis et al. |
| 2011/0276468 A1 | 11/2011 | Lewis et al. |
| 2012/0101970 A1 | 4/2012 | Zernik et al. |
| 2013/0097709 A1 | 4/2013 | Basavapatna et al. |
| 2013/0110692 A1 | 5/2013 | Nightengale et al. |
| 2014/0289867 A1 | 9/2014 | Bukai |
| 2014/0304814 A1 | 10/2014 | Ott et al. |
| 2015/0046332 A1 | 2/2015 | Adjaoute |
| 2015/0205957 A1 | 7/2015 | Turgeman et al. |
| 2015/0206214 A1* | 7/2015 | Adjaoute ............. G06Q 50/265 705/26.35 |
| 2015/0324908 A1* | 11/2015 | Starikova ............... G06Q 40/03 705/38 |
| 2016/0005044 A1 | 1/2016 | Moss et al. |
| 2016/0071025 A1 | 3/2016 | Brand et al. |
| 2016/0143570 A1 | 5/2016 | Valacich et al. |
| 2016/0226901 A1 | 8/2016 | Baikalov et al. |
| 2016/0232353 A1 | 8/2016 | Gupta et al. |
| 2016/0328572 A1 | 11/2016 | Valacich et al. |
| 2017/0032463 A1 | 2/2017 | Hunter et al. |
| 2017/0070521 A1 | 3/2017 | Bailey et al. |
| 2017/0134412 A1 | 5/2017 | Cheng et al. |
| 2017/0161747 A1 | 6/2017 | Einhorn et al. |
| 2017/0213280 A1 | 7/2017 | Kaznady |
| 2017/0221055 A1 | 8/2017 | Carlsson et al. |
| 2017/0286671 A1 | 10/2017 | Chari et al. |
| 2018/0160309 A1 | 6/2018 | Turgeman et al. |
| 2018/0191745 A1 | 7/2018 | Moradi et al. |
| 2018/0191762 A1 | 7/2018 | Bailey et al. |
| 2019/0026754 A1* | 1/2019 | Miltonberger ..... G06Q 30/0185 |
| 2019/0158535 A1* | 5/2019 | Kedem .................. G06F 16/00 |
| 2019/0205885 A1 | 7/2019 | Lim et al. |
| 2019/0253431 A1 | 8/2019 | Atanda |
| 2019/0311367 A1 | 10/2019 | Reddy et al. |
| 2019/0378397 A1 | 12/2019 | Williams, II et al. |
| 2020/0097662 A1* | 3/2020 | Hufsmith .............. H04L 9/0643 |
| 2020/0279284 A1 | 9/2020 | Garg et al. |

OTHER PUBLICATIONS

International Search Report and Written Opinion for Application No. PCT/CA2020/051315 dated Dec. 30, 2020 (12 pages).
International Search Report and Written Opinion for Application No. PCT/CA2020/050268 dated May 26, 2020 (7 pages).
International Search Report and Written Opinion for Application No. PCT/CA2020/050269 dated Apr. 29, 2020 (11 pages).
International Search Report and Written Opinion for Application No. PCT/CA2020/050270 dated May 22, 2020 (12 pages).
Wang et al., "The Visual Causality Analyst: An Interactive Interface for Causal Reasoning," IEEE Transactions on Visualization and Computer Graphics, 2016, 22(1): 230-239.

\* cited by examiner

MULTI-PAGE ONLINE APPLICATION ORIGINATION (OAO) SERVICE FOR FRAUD PREVENTION SYSTEMS

CROSS-REFERENCE TO RELATED APPLICATION

This application claims priority to and benefit of U.S. Provisional Application No. 62/812,749, filed on Mar. 1, 2019 and U.S. Provisional Application No. 62/976,026, filed on Feb. 13, 2020, the entire contents of which is incorporated herein by reference.

BACKGROUND

Preventing identity fraud is a major area of attention for merchants and financial institutions. It is estimated there were more than sixteen million victims of identity fraud in 2017, with $16.8 billion in losses attributed to identity theft alone. More than a million fraud-related incidents were reported in 2017. Credit card fraud was also the most reported form of identity theft with over one hundred and thirty thousand reports in 2017. More concerning, it is estimated that more than fifty-eight million records have been exposed between January and November of 2018.

Identity theft is typically difficult to prevent for two main reasons. First, conventional detection methods tend to fail because those methods are based on analysis of personally identifiable information (also referred to as "PII") (which may be stolen) or analysis of traffic properties (which may be obscured or faked). Second, conventional detection methods do not prevent loss because the conventional methods look at the data being entered, rather than a contextualized view of a user's behavior. In general, the conventional detection methods are reactive because the conventional detection methods require analysis after-the-fact to detect fraud and thus do not proactively prevent fraud losses.

SUMMARY

Embodiments described herein relate to an online application origination service (also referred to as "OAO service") for fraud prevention systems. The OAO service analyzes a user's behavior at the point of online application submission, providing real-time risk assessment and detecting high-risk application attempts, while enabling friction-free processing of low-risk applications. Behavioral biometrics provide a more reliable means of loss prevention by analyzing reliable behavior signals, and detecting fraud at application-time, prior to possible losses. The OAO service provides fraud prevention and good user verification at the point of online application origination, providing case-specific risk assessment and escalation of fraudulent application attempts.

One advantage to the OAO service over conventional methods is a higher capture rate of nefarious actors by utilizing behavioral analysis. Another advantage is more efficient use of computer resources by a client server. For example, the higher capture rate by the fraud prevention server results in more fraudulent on-line applications being denied at the client server, which allows the client server to more efficiently and effectively focus its resources on other tasks.

One embodiment described herein is a fraud prevention system that includes a client server and a fraud prevention server. The fraud prevention server includes an electronic processor and a memory. The memory includes an online application origination (OAO) service. When executing the OAO service, the electronic processor is configured to determine whether the OAO service is enabled, determine whether a website configuration includes a list of multi-page placements for an online application, determine that input data needs to be stored in the memory and combined into multi-page input data in response to determining that the OAO service is enabled and that the website configuration includes the list of multi-page placements for the online application, determine a fraud risk score of the online application based on the multi-page input data and an online application origination (OAO) model that differentiates between a behavior of a normal user and a behavior of a nefarious actor during a submission of the online application on a device, and control a client server to approve, hold, or deny the online application based on the fraud risk score that is determined.

Another embodiment described herein is a method for operating a fraud prevention system. The method includes determining, with an electronic processor of a fraud prevention server, whether an online application origination (OAO) service is enabled. The method includes determining, with the electronic processor, whether a website configuration includes a list of multi-page placements for an online application. The method includes determining, with the electronic processor, that input data needs to be stored in the memory and combined into multi-page input data in response to determining that the OAO service is enabled and that the website configuration includes the list of multi-page placements for the online application. The method includes determining, with the electronic processor, a fraud risk score of the online application based on the multi-page input data and an online application origination (OAO) model that differentiates between a behavior of a normal user and a behavior of a nefarious actor during a submission of the online application on a device. The method also includes controlling, with the electronic processor, a client server to approve, hold, or deny the online application based on the fraud risk score that is determined.

Yet another embodiment described herein is a non-transitory computer-readable medium comprising instructions that, when executed by a fraud prevention server, cause the fraud prevention server to perform a set of operations. The set of operations includes determining whether the OAO service is enabled. The set of operations includes determining whether a website configuration includes a list of multi-page placements for an online application. The set of operations includes determining that input profile record data needs to be stored in the memory and combined into multi-page input data in response to determining that the OAO service is enabled and that the website configuration includes the list of multi-page placements for the online application. The set of operations includes determining a fraud risk score of the online application based on the multi-page input data and an online application origination (OAO) model that differentiates between a behavior of a normal user and a behavior of a nefarious actor during a submission of the online application on a device. The set of operations also includes controlling a client server to approve, hold, or deny the online application based on the fraud risk score that is determined.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more electronic processors, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more electronic processors, one or more computer-readable medium modules, one or more input/output interfaces, and various connections (e.g., a system bus) connecting the various components.

Other aspects of the embodiments will become apparent by consideration of the detailed description and accompanying drawings.

DETAILED DESCRIPTION

Embodiments described herein relate to an online application origination service (also referred to as "OAO service") for a fraud prevention system, and environments and systems utilizing this service. The OAO service analyzes form completion behavior, evaluating hundreds of non-identifying and zero-permission attributes against each application. These attributes capture a variety of distinctive behavioral markers that are predictive of application fraud risk.

Nefarious actors tend to display a familiarity with, e.g., form content and technological fluency that allows them to complete forms quickly, surely and by leveraging technological tricks and shortcuts. The OAO service monitors dozens of attributes related to typing speed and cadence, fluency of field navigation, shortcut use and form familiarity (expressed through such behaviors as skipping optional fields and avoiding form completion errors). The OAO service evaluates a range of directness, exploratory and detail-checking behaviors that differ significantly between good and nefarious actors. Additionally, in some examples, the OAO service may also evaluate any number of non-behavioral features along with the behavioral features to further distinguish between good and nefarious actors. For example, one example non-behavioral feature that may be evaluated by the OAO service has_anonymous_ip as discussed below.

Figure 1:
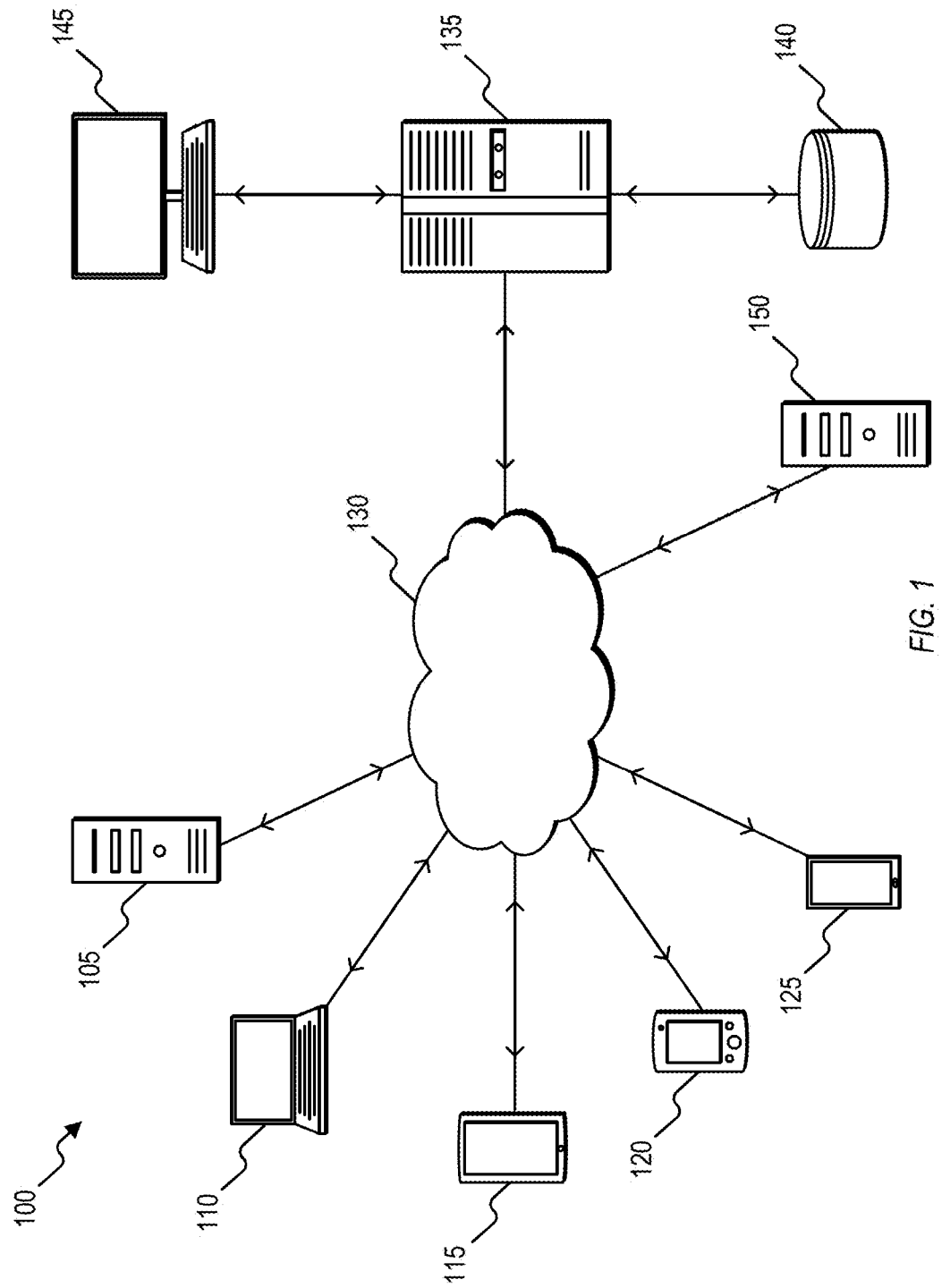
FIG. 1 is a diagram that illustrates a fraud prevention system for an OAO service that evaluates a user's behavior while opening an online account, according to embodiments described herein.

FIG. 1 illustrates a system 100 for an OAO service that evaluates a user's behavior while opening an online account. The system 100 includes a plurality of user devices 105-125, a network 130, a fraud prevention server 135, a database 140, a server-side user interface 145 (e.g., a workstation), and a client server 150. The plurality of user devices 105-125 include, for example, a personal, desktop computer 105, a laptop computer 110, a tablet computer 115, a personal digital assistant ("PDA") (e.g., an iPod touch, an e-reader, etc.) 120, and a mobile phone (e.g., a smart phone) 125. Each of the user devices 105-125 is configured to communicatively connect to the fraud prevention server 135 through the network 130 and provide information to the fraud prevention server 135 related to attributes or values for attributes of the user devices 105-125. Attributes of the user devices 105-125 include, for example, user agent, operating system, account ID, location, time of day, mouse location, or other suitable attribute information regarding both the user device and a user of the user device. Attribute information received from the user devices 105-125 at the fraud prevention server 135 may be stored in the database 140.

The network 130 is, for example, a wide area network ("WAN") (e.g., a TCP/IP based network), a local area network ("LAN"), a neighborhood area network ("NAN"), a home area network ("HAN"), or personal area network ("PAN") employing any of a variety of communications protocols, such as Wi-Fi, Bluetooth, ZigBee, etc. In some implementations, the network 130 is a cellular network, such as, for example, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3GSM network, a 4GSM network, a 4G LTE network, a Digital Enhanced Cordless Telecommunications ("DECT") network, a Digital AMPS ("IS-136/TDMA") network, or an Integrated Digital Enhanced Network ("iDEN") network, etc.

The connections between the user devices 105-125 and the network 130 are, for example, wired connections, wireless connections, or a combination of wireless and wired connections. The connection between the fraud prevention server 135 and the network 130 is a wired connection, wireless connection, or a combination of wireless and wired connections. The connection between the client server 150 and the network 130 is a wired connection, wireless connection, or a combination of wireless and wired connections.

The client server 150 is a server of a resource provider. For example, the client server 150 is a bank server that provides a credit card to a user that establishes an account with the bank by performing an online application origination (e.g., filling out a form, either as part or all of what is required to establish an account). The remainder of the disclosure refers to a "credit card" as the resource that is provided by the resource provider. However, any resource that is available by an online application origination may be considered in place of the "credit card" as described herein.

Figure 2:
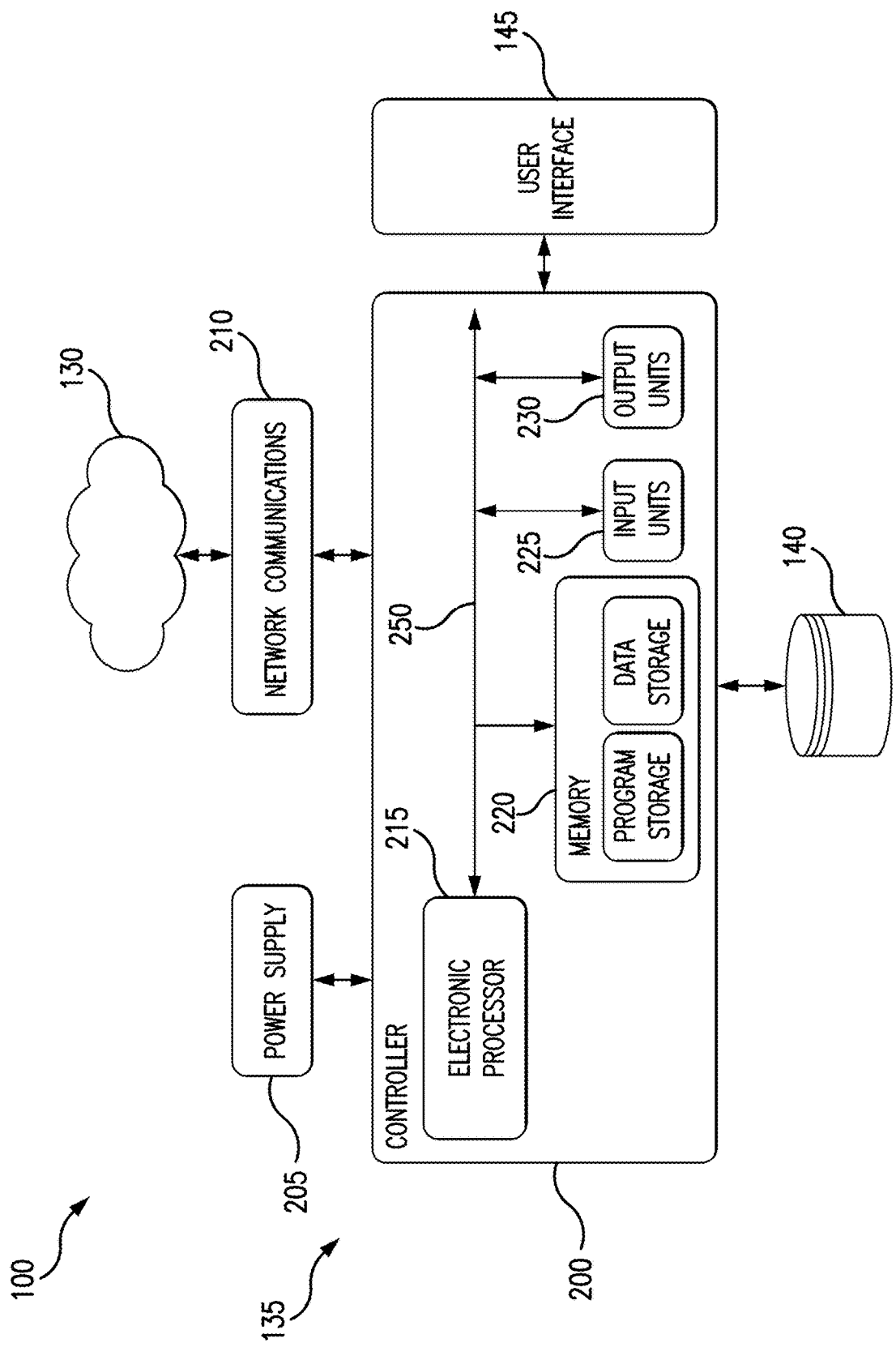
FIG. 2 is a block diagram that illustrates the server of the fraud prevention system of FIG. 1, according to embodiments described herein.

FIG. 2 is a block diagram that illustrates the fraud prevention server 135 of the system 100 of FIG. 1. The fraud prevention server 135 is electrically and/or communicatively connected to a variety of modules or components of the system 100. For example, the illustrated fraud prevention server 135 is connected to the database 140 and the user interface 145. The fraud prevention server 135 includes a controller 200, a power supply module 205, and a network communications module 210. The controller 200 includes combinations of hardware and software that are configured to, for example, provide the OAO service to evaluate the behaviors of the users associated with the devices 105-125 while the users are opening an online account. The controller 200 includes a plurality of electrical and electronic components that provide power, operational control, and protection to the components and modules within the controller 200 and/or the system 100. For example, the controller 200 includes, among other things, an electronic processor 215 (e.g., a microprocessor, a microcontroller, or other suitable processing device), a memory 220, input units 225, and output units 230. The electronic processor 215, the memory 220, the input units 225, and the output units 230, as well as the various modules connected to the controller 200 are connected by one or more control and/or data buses (e.g., common bus 250). The control and/or data buses are shown schematically in FIG. 2 for illustrative purposes.

The memory 220 is a non-transitory computer-readable medium and includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, electronic memory devices, or other data structures. In some examples, the program storage area may store the instructions regarding the OAO service program (referred to herein as "OAO service") as described in greater detail below.

The electronic processor 215 executes machine-readable instructions stored in the memory 220. For example, the electronic processor 215 may execute instructions stored in the memory 220 to perform the functionality of the OAO service. In some examples, the functionality of the OAO service includes an OAO model as well as machine learning to generating a machine learning function.

Machine learning generally refers to the ability of a computer program to learn without being explicitly programmed. In some embodiments, a computer program (for example, a learning engine) is configured to construct an algorithm (also referred to herein as a "machine learning function" or "statistical function") based on inputs. Supervised learning involves presenting a computer program with example inputs and their desired outputs. The computer program is configured to learn a general rule that maps the inputs to the outputs from the training data it receives. Example machine learning engines include decision tree learning, association rule learning, artificial neural networks, classifiers, inductive logic programming, support vector machines, clustering, Bayesian networks, reinforcement learning, representation learning, similarity and metric learning, sparse dictionary learning, and genetic algorithms. Using one or more of the approaches described above, a computer program can ingest, parse, and understand data and progressively refine algorithms for data analytics. In some examples, the machine learning performed by the fraud prevention server 135 in executing the OAO service is an ensemble machine learning model named XGBoost (eXtreme Gradient Boosting trees), a gradient boosting algorithm implemented for speed and performance. This learning model utilizes many (for example, thousands) of independent trees whose results are aggregated or otherwise combined (e.g. via voting) to produce a final prediction value.

In some examples, one implementation of the machine learning is to extract the statistical function learned by the fraud prevention server 135 and deploy the statistical function as a lightweight endpoint (i.e., the OAO model stored in the memory 220) on the fraud prevention server 135. The fraud prevention server 135 may call the OAO model with a real data sample to obtain an immediate prediction. This is typically done using an application container, e.g., using the Docker technology.

In other examples, another implementation of the machine learning is to extract the statistical function learned by the fraud prevention server 135 and deploy the statistical function as a rule in a larger online application service on the fraud prevention server 135. This implementation executes the OAO service as a rule alongside other rules (for example, alongside the rules described below), folding the OAO model (i.e., the statistical function) neatly into a larger online application service.

In some embodiments, the controller 200 or network communications module 210 includes one or more communications ports (e.g., Ethernet, serial advanced technology attachment ["SATA"], universal serial bus ["USB"], integrated drive electronics ["IDE"], etc.) for transferring, receiving, or storing data associated with the system 100 or the operation of the system 100. Software included in the implementation of the system 100 can be stored in the memory 220 of the controller 200. The software includes, for example, firmware, one or more applications, program data, filters, rules, one or more program modules, and other executable instructions. The controller 200 is configured to retrieve from memory and execute, among other things, instructions related to the OAO service described herein.

The power supply module 205 supplies a nominal AC or DC voltage to the controller 200 or other components or modules of the system 100. The power supply module 205 is powered by, for example, mains power having nominal line voltages between 100V and 240V AC and frequencies of approximately 50-60 Hz. The power supply module 205 is also configured to supply lower voltages to operate circuits and components within the controller 200 or system 100.

The user interface 145 includes a combination of digital and analog input or output devices required to achieve a desired level of control and monitoring of the system 100. For example, the user interface 145 includes a display (e.g., a primary display, a secondary display, etc.) and input devices such as a mouse, touch-screen displays, a plurality of knobs, dials, switches, buttons, or other suitable input device. The display is, for example, a liquid crystal display ("LCD"), a light-emitting diode ("LED") display, an organic LED ("OLED") display, or other suitable display.

The fraud prevention server 135 is configured to perform the OAO service to evaluate how fields have been completed, evaluating a broad set of attributes that enable the model to distinguish between benign autofill and scripted form completion. By looking at fields that are challenging to autofill, the fraud prevention server 135 is able to separate autofill from scripted automation by detecting the effectiveness of form-specific scripted solutions. Similarly, the fraud prevention server 135 separates good users and nefarious actors by differentiating their behavior, for example, by detecting common manual fraud approaches (e.g., copy-paste) and even assessing user familiarity with the data in highly memorable fields (e.g., a Full Name field and a Phone Number field). This assessment of user familiarity is based on how encrypted data is entered into the highly memorable fields. The OAO service does not receive or process any of the encrypted data that is entered into the various fields.

The fraud prevention server 135 monitors the fields that are being completed either directly or indirectly. In some examples, when the client server 150 hosts the entire online application, the fraud prevention server 135 may indirectly receive information regarding these fields when the client server 150 stores the fields that have been completed in memory and transmits this information to the fraud prevention server 135. For example, the client server 150 may transmit this information to the fraud prevention server 135 in real-time or near real-time or may transmit this information to the fraud prevention server 135 upon submission of the online application to the client server 150.

Alternatively, in other examples, the fraud prevention server 135 may partially or completely host the online application. In these examples, the fraud prevention server 135 may directly store information regarding the fields that have been completed with respect to the online application in the memory 220.

Alternatively, in yet other examples, one or more of the user devices 105-125 may partially or completely host the OAO service and produce a decision on the respective user device. In these examples, the one or more of the user devices 105-125 may directly store information regarding the fields that have been completed with respect to the online application in a respective memory.

The following data points are an illustrative subset of the data that may be used by the fraud prevention server 135 in performing the OAO service to detect fraudulent behavior (and consequently, application risk): 1) cadence of completing the form, 2) method of moving through the form (click or tab), 3) progression through the form, 4) field order and 'circle back' behavior, 5) cadence and speed of user typing, 6) form focus and window-switching behavior, 7) detail-checking, and pausing behavior, 7) dynamics of mouse and touch interactions, 8) device orientation and accelerometer, 9) form field autocomplete or copy-paste behavior, and 10) familiarity with the form, e.g., omission of optional fields and error incidence rate.

The OAO service executed by the fraud prevention server 135 includes an OAO model. In some embodiments, the fraud prevention server 135 receives a dataset of fraudulent applications (e.g., hundreds or thousands of example fraudulent applications) and uses the machine learning to output an OAO model that accounts for the various fraudulent aspects of the dataset as set forth in the feature set below. The fraud prevention server 135 may then use the OAO model that is generated by machine learning to perform advanced classifications and generate a "Fraud Risk" score against application attempts in real-time. The "Fraud Risk" score measures the probability that the current application attempt was performed by a nefarious actor using manual or automated identify fraud. This probability is calculated using real-world data, where the fraud prevention server 135 compares thousands of model variants using the dataset from tens of thousands of applications across various application forms.

Figure 3:
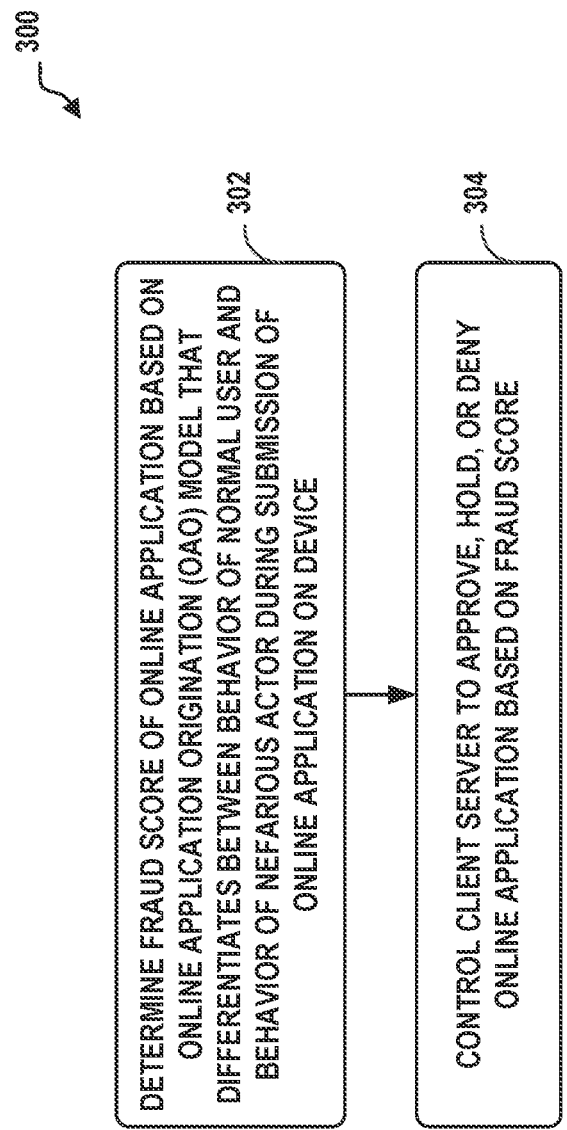
FIG. 3 is a flowchart that illustrates a method for performing the OAO service to evaluate a user's behavior while opening an online account, according to embodiments described herein.

FIG. 3 is a flowchart that illustrates a method 300 for performing the OAO service to evaluate a user's behavior while opening an online account. The method 300 is described with respect to the fraud prevention server 135 of FIGS. 1 and 2.

The method 300 includes the fraud prevention server 135 calculating a score of an online application origination based on the OAO model (at block 302). For example, the fraud prevention server 135 may calculate a "Fraud Risk" score in real-time or near real-time, which may be used as a real-time actionable assessment (e.g., "High Risk," "Moderate Risk," or "Low Risk") based on configurable thresholds assigned to a specific customer as described in greater detail below with respect to the OAO feature set. In some examples, the "Fraud Risk" score may be a 0 . . . 1 continuous value with different thresholds for the "High Risk," "Moderate Risk," and "Low Risk." In other examples, the "Fraud Risk" score may any suitable numerical range that is capable of being divided into various thresholds. The fraud prevention server 135 may also adjust thresholds with respect to the "High Risk," "Moderate Risk," and Low Risk" to increase fraud capture rate or reduce false positive rate. For example, the fraud prevention server 135 may entirely eliminate the "Moderate Risk" threshold to provide just "High Risk" and "Low Risk". Alternatively, for example, the fraud prevention server 135 may use "Moderate Risk" or add thresholds beyond "Moderate Risk" to further diversify the fraud capture rate or reduce false positive rate.

The method 300 also includes the fraud prevention server 135 controlling a client server to approve, hold, or deny the online application based on the score (at block 304). For example, the fraud prevention server 135 may control the client server to approve the online application when the score is a "Low Risk" score, hold the online application when the score is a "Moderate Risk" score, and deny the online application when the score is a "High Risk" score.

In some examples, the fraud prevention server 135 controls the client server 150 to approve, hold, or deny the online application based on the score by transmitting an approval signal, a hold signal, or a denial signal to the client server 150 to cause the client server 150 to approve, hold, or deny the online application. However, in other examples, the fraud prevention server 135 controls the client server 150 to approve, hold, or deny the online application based on the score by transmitting an approval recommendation, a hold recommendation, or a denial recommendation to the client server 150 to influence an approve, hold, or deny decision on the online application made by the client server 150.

High-risk traffic displays behaviors consistent with manual or automated fraud, and high-risk applications should be subject to greater security and enhanced application process. Moderate-risk application attempts are generated when behavior is inconclusively suspect. Moderate-risk signals may be subject to increased scrutiny (e.g., a Fraud Analyst inspection).

In some examples, a "High Risk" threshold is a risk score of greater than or equal to 0.45 and a "Moderate Risk" risk score of greater than 0.3. As this is on unlabeled data, based on past experience, the fraud prevention server 135 may estimate an approximate 67% capture rate, while achieving a false positive ratio of 5:4 (true positives:false positives).

To test the OAO service, the fraud prevention server 135 generated specific results using an existing global population of 47,118 credit card application attempts for an example bank between September 2018 and November 2018.

Figure 4:
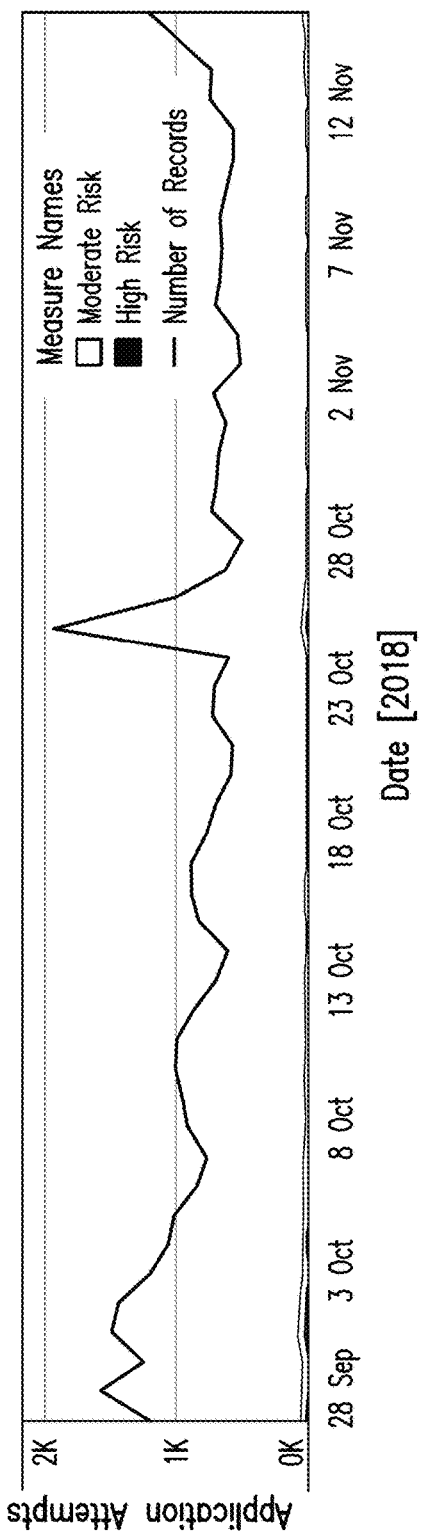
FIG. 4 is an example graph that illustrates a risk level for every application attempt in the global population over a thirty date period based on the OAO score band, according to embodiments described herein.

FIG. 4 is a graph that illustrates a risk level for every application attempt in the global population over a thirty day period based on the OAO score band. As illustrated in FIG. 4, the fraud prevention server 135 identified a risk level for every application attempt in the global population.

Figure 5:
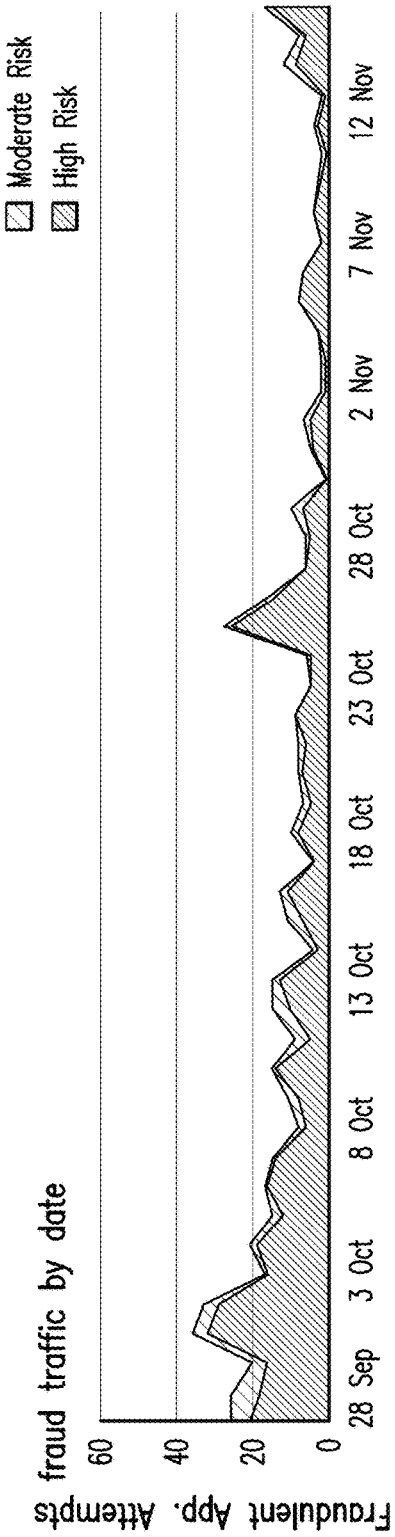
FIG. 5 is an example graph that illustrates the fraud traffic over the thirty day period based on the OAO score band, according to embodiments described herein.

FIG. 5 is a graph that illustrates the fraud traffic over the thirty day period based on the OAO score band. As illustrated in FIG. 5, during this thirty day period, the fraud prevention server 135 with the OAO service identified 451 High Risk form submissions, which constituted 0.95% of all form completion attempts.

Focusing on successfully processed and accepted form submissions by the example bank, the fraud prevention server 135 identified 146 risky applications. The 146 risky applications were composed of 125 High Risk applications and 21 Moderate Risk applications that were successfully processed and accepted by the example bank.

The fraud prevention server 135 uses the OAO service and a broad set of contextual data to compute the OAO Real-Time Score, an aggregated measure of transaction fraud risk, and the OAO score band, a translation of the OAO Score into traffic light-style risk bands (red, yellow, green). OAO score components are described further in Appendix B: Guide to OAO Intelligence.

Figure 6:
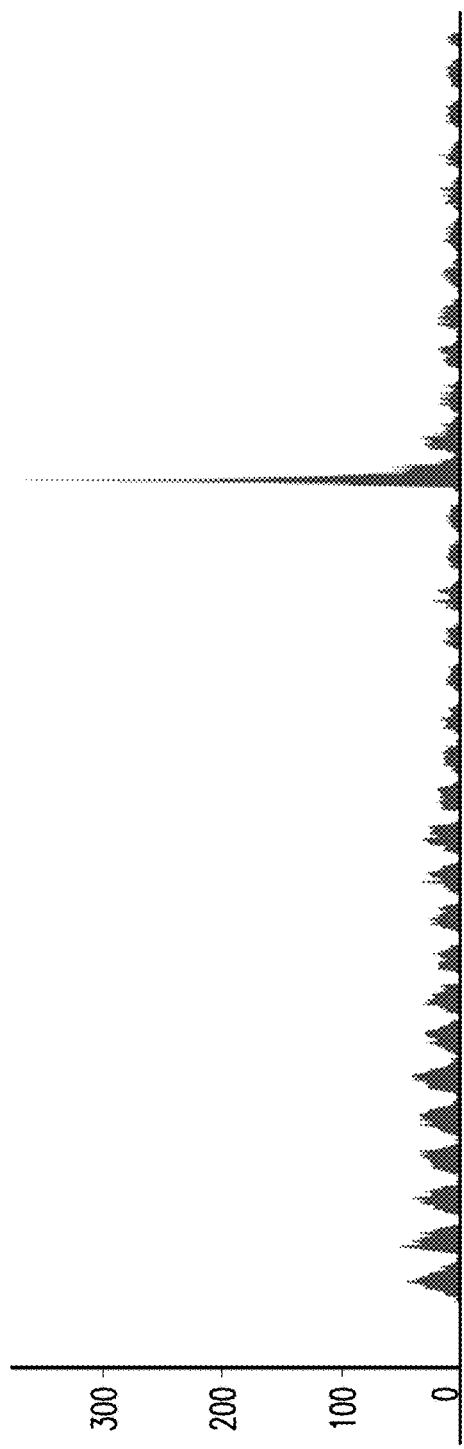
FIG. 6 is an example graph that illustrates the total volume of observed hourly transactions against a first credit card application placement on an hourly basis between Oct. 5, 2018 and Nov. 5, 2018 and based on the OAO score band, according to embodiments described herein.

FIG. 6 is a graph that illustrates the total volume of observed hourly transactions against a first credit card application placement on an hourly basis between Oct. 5, 2018 and Nov. 5, 2018 and based on the OAO score band.

As illustrated in FIG. 5, traffic volume increased significantly on Oct. 25, 2018. However, the fraud prevention server 135 did not identify a significant proportion of red score band traffic in this period, specifically, three application attempts were assigned to the red score band.

The fraud prevention server 135 observed a spike of both high-risk and global traffic on Oct. 25, 2018. The fraud prevention server 135 identified a proportionate increase in both high-risk and low-risk traffic. Success rates remained consistent across the period, and the percentage of applications estimated as High Risk by the fraud prevention server 135 did not significantly increase.

Within the above thirty day period, the following traffic properties were observed on the first credit card application placement: 1) 9.8 k Credit Card Application Attempts, 2) 3.3 k Successful Applications, 3) 6.5 k Failed Applications, 4) 9.1 k Devices Validated, 5) 9.3 k IP Addresses Verified, 6) 48% of the Credit Card Application Attempts were on a Mobile Device, 7) 12 Geo-Locations were Identified, and 8) 9 k Endpoints were Validated.

The first credit card application placement contained lower levels of activity than a second credit card application placement, in terms of overall activity volume and variety (number of geolocations, endpoints). In terms of the rules of the OAO service, the most common rules triggered were related to geographical mismatch at a state level (49% of the total number of applications) and the use of older browser versions (43% of the total number of applications). Both of these signals may be seen against both nefarious and benign users.

The fraud prevention server 135 identified a number of higher-risk signals when analyzing the traffic of the first credit card application placement. Most significantly, the fraud prevention server 135 identified scripted input against 11% of the total number of applications, while IP anomalies were detected against 4% of the total number of applications. The fraud prevention server 135 also detected high-risk email domains against 3% of the total number of applications, and an ISP risk was identified against 2% of the total number of applications.

Figure 7:
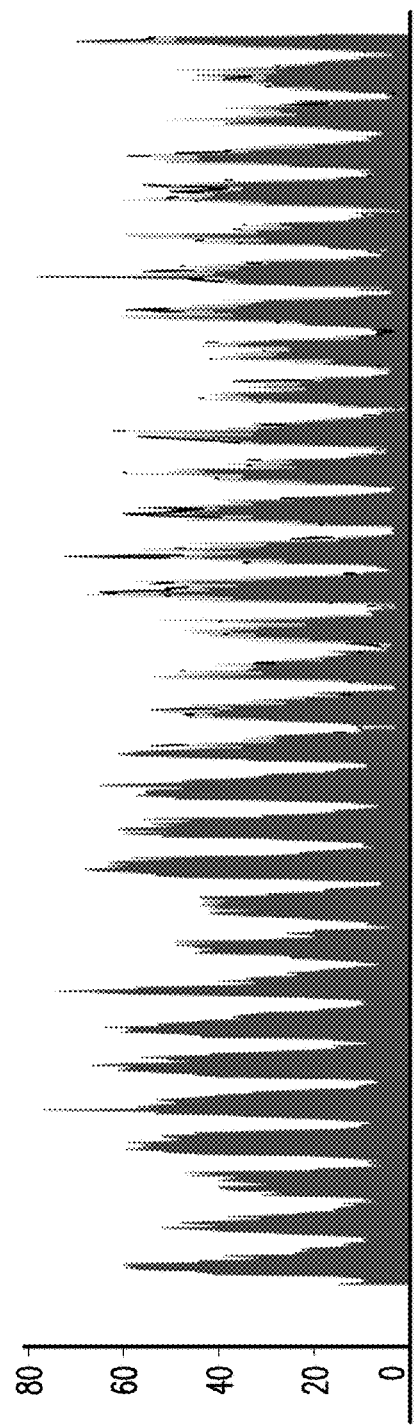
FIG. 7 is an example graph that illustrates the total volume of observed hourly transactions against a second credit card application placement on an hourly basis between Oct. 5, 2018 and Nov. 5, 2018 and based on the OAO score band, according to embodiments described herein.

FIG. 7 is a graph that illustrates the total volume of observed hourly transactions against a second credit card application placement on an hourly basis between Oct. 5, 2018 and Nov. 5, 2018 and based on the OAO score band. The second credit card application placement saw higher traffic volumes than the first credit card application placement, with consistent application volume throughout the period. The second credit card application placement also saw an increase in higher-risk traffic from October 18th onward. Overall, 23 applications (0.27% of the total number of applications) were identified as falling into the red High Risk score band, and 274 applications (3.16% of the total number of applications) identified as yellow Moderate Risk score band.

Within the above thirty day period, the following traffic properties were observed on the second credit card application placement: 1) 22.9 k Credit Card Application Attempts, 2) 5.1 k Successful Applications, 3) 17.8 k Failed Applications, 4) 20.8 k Devices Validated, 5) 21.3 k IP Addresses Verified, 6) 40% of the Credit Card Application Attempts were on a Mobile Device, 7) 57 Geo-Locations were Identified, and 8) 20.3 k Endpoints were Validated.

In terms of the rules of the OAO service, the most common rules triggered were related to geographical mismatch at a state level (49% of the total number of applications) and the use of older browser versions (38% of the total number of applications). Both of these signals may be seen against both nefarious and benign users.

Significantly more application attempts failed against the second credit card application placement (78% of the total number of applications) than against the first credit card application placement (69% of the total number of applications). Additionally, the fraud prevention server 135 identified a number of higher-risk signals when analyzing the traffic of the second credit card application placement. Most significantly, the fraud prevention server 135 identified scripted input against 18% of the total number of applications, while IP anomalies were detected against 5% of the total number of applications. The fraud prevention server 135 also detected high-risk email domains against 5% of the total number of applications, and an ISP risk was identified against 4% of the total number of applications.

The relatively high volume of scripted input indicates a scripted attack against the second credit card application placement. The fraud prevention server 135 identified a small attack from three distinct devices that made 33 application attempts against the second credit card application placement throughout the thirty day period. 80% of these requests came from a known cloud hosting IP organization, with the rest originating from outside the USA.

As briefly described above, the OAO model of the OAO service includes a feature set for differentiating between a behavior of a valid user and a behavior of a nefarious actor to determine whether the online application origination is fraudulent or valid. Table 1 below sets forth the features that may be included in the feature set of the OAO model.

TABLE 1

| Feature Name | Feature Description |
| --- | --- |
| time_last_key_submit_ms | $totalTimeMS incremented per event; Total time - last key time calculated after all events processed; Calculated per page or calculated based on last page |
| avg_focus_key_time | Focus to first key pressed delta calculated per field; Average calculated on data export |
| tot_mouse_dist | Total mouse distance; Move events accumulated as processed; Distance calculated after all events processed; Distance between pages may be included or excluded |
| mc_Y_std | standard deviation of mouse click in Y direction; Mouse click events accumulated as processed; STD calculated when value requested |
| ks_coef_var | coefficient of variation of keystroke rate across all fields in the form |
| mc_X_std | standard deviation of mouse click in X direction; Mouse click events accumulated as processed; STD calculated when value requested |
| avg_ks_rate_ms_std | Standard deviation of average keystroke rate is calculated per field; Average calculated on data export |
| infield_time_ratio | ratio of time spent in fields (when focused in) to the overall time on page. mTotalTimeInFieldsMS/mTimeOnPageMS Total time incremented per event; Time in fields calculated per field |
| time_on_page_ms | Total time incremented per event; calculated per page or a sum of all pages |
| total_mc_count | Count incremented on each mouse click event |
| avg_field_clicks | average number of mouse clicks per field; Form focus events accumulated as processed; Mean calculated when value requested |

TABLE 1-continued

| Feature Name | Feature Description |
| --- | --- |
| total_ks_count | Keystroke count calculated per field; Counts summed on data export |
| avg_ff2firstevent | Form focus events accumulated as processed; Average calculated when value requested |
| multi_focus_field_perct | Form focus events accumulated as processed; Percentile calculated when value requested |
| has_proxy_concealed | Whether triggered the proxy_concealed OAO rule |

Figure 8:
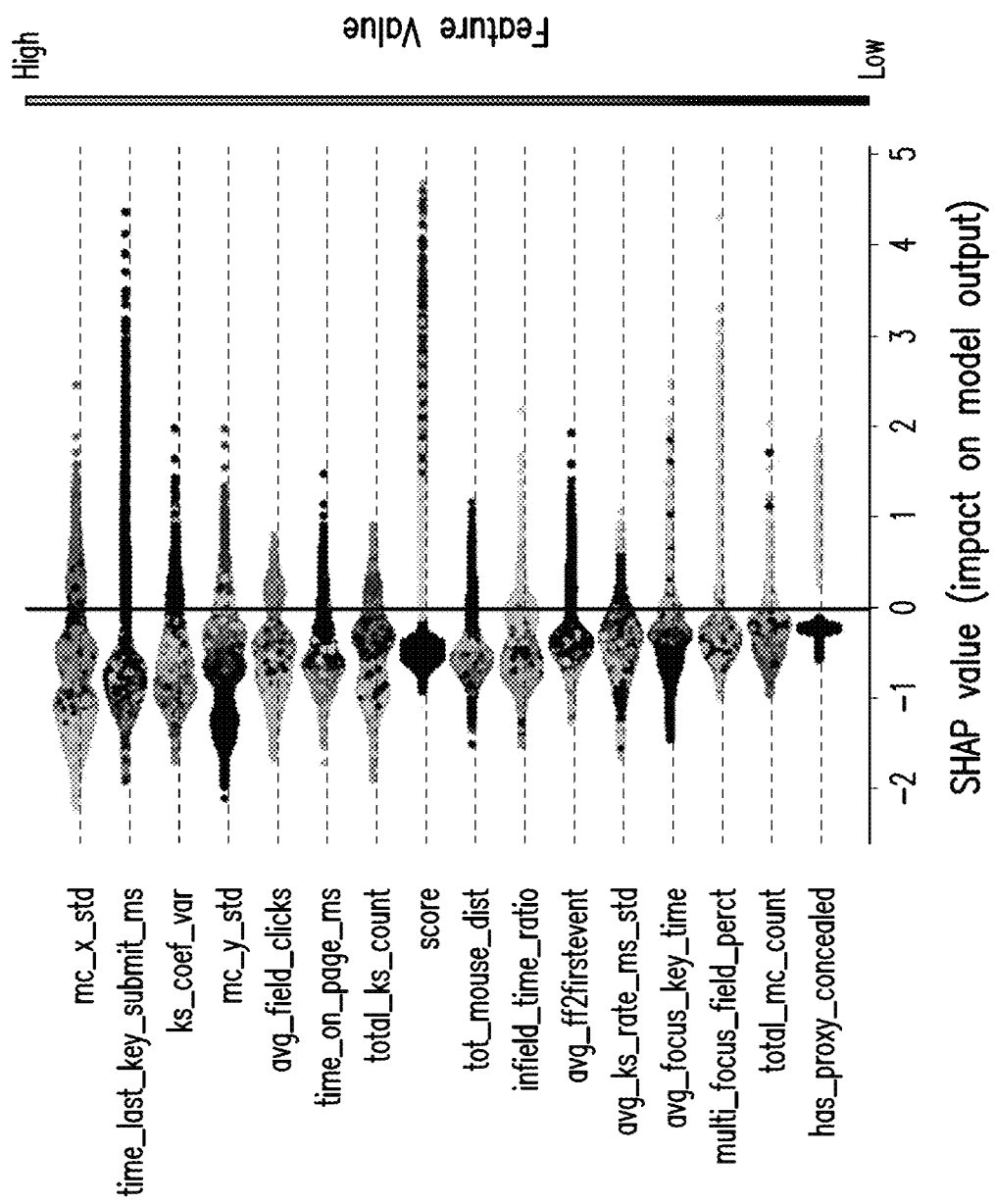
FIG. 8 is an example graph that illustrates feature values associated with a subset of features from the OAO model against Shapley Additive exPlanation (SHAP) values of the subset regarding the impact of the subset on the output of the OAO model, according to embodiments described herein.

FIG. 8 is an example graph that illustrates feature values associated with an example subset of features from the OAO model against Shapley Additive exPlanation (SHAP) values of the subset regarding the impact of the subset on the output of the OAO model. As illustrated in FIG. 8, in one example, some of the most impactful features of the above feature set includes mc_x_std, time_last_key_submit_ms, ks_coef_var, mc_y_std, avg_field_clicks, time_on_page_ms, tot_mouse_dist, infield_time_ratio, avg_ks_rate_ms_std, avg_focus_key_time, total_mc_count, and has_proxy concealed. Most of these impactful features are behavior features except, for example, the has_proxy_concealed feature.

Figure 9:
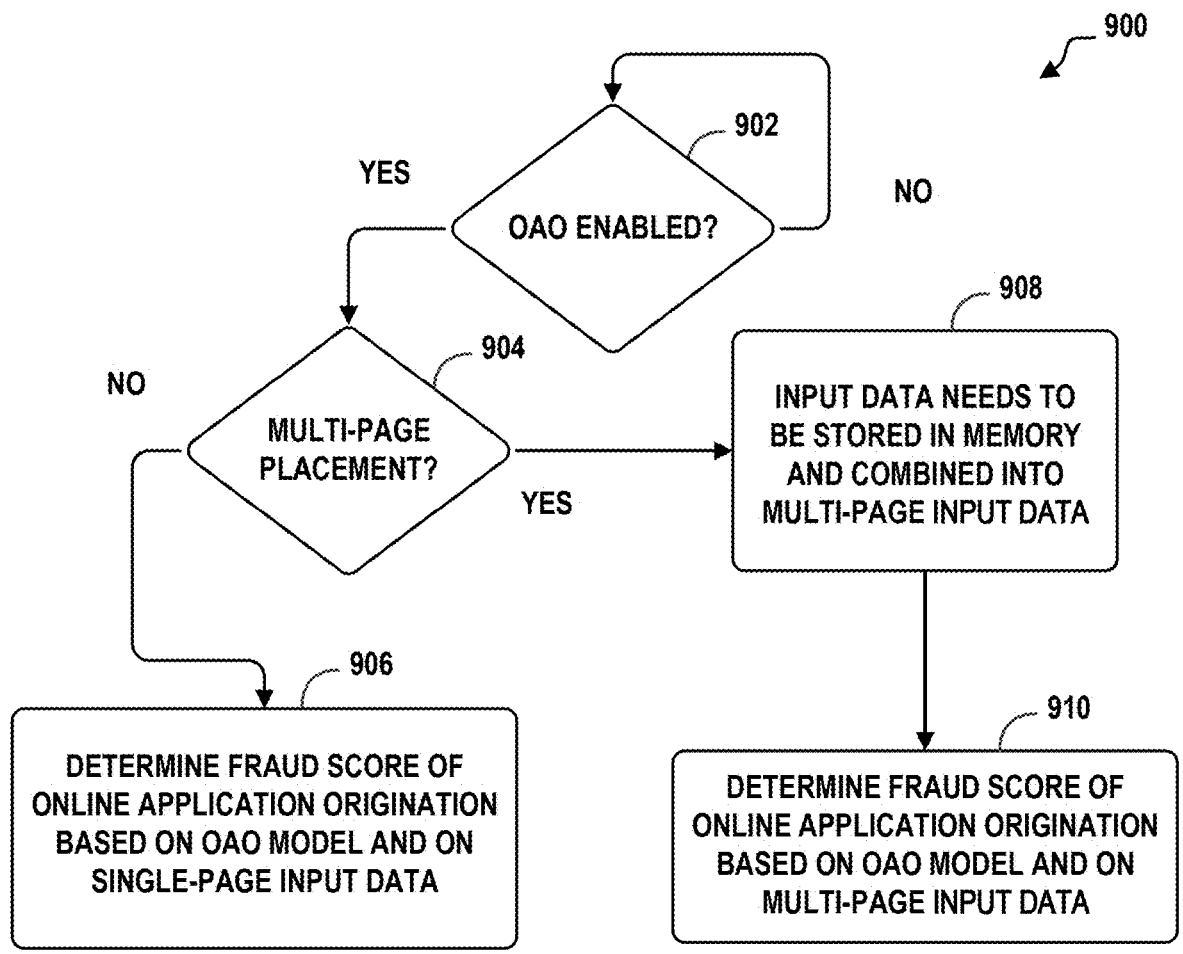
FIG. 9 is a flowchart that illustrates a method for performing the OAO service for an online application that includes multiple online webpages, according to embodiments described herein.

FIG. 9 is a flowchart that illustrates a method 900 for performing the OAO service for an online application that includes multiple online webpages. The method 900 is described with respect to the fraud prevention server 135 of FIGS. 1 and 2 and the method 300 of FIG. 3.

As described above with respect to FIG. 3, the method 300 includes the fraud prevention server 135 determining a score of an online application origination based on the OAO model (at block 302). However, the score of the online application origination may be either set to a single webpage flow or extended across a multi-webpage flow.

When the score of the online application origination is set to a single webpage flow, as a user moves from one webpage to another webpage of an online application origination that has a multi-webpage flow, input) data collected on the previous webpage will be overwritten with the input data from the current webpage. In some examples, the last webpage in the multi-webpage flow may have one or several check boxes, which makes the input data associated with the last webpage insufficient for accurate scoring by the OAO model. To handle the insufficient input data, the OAO service executed by the fraud prevention server 135 would need to return an "Applicant Form No User Input" signal with a risk penalty to ensure a score by the OAO model is not "Low Risk" or "Moderate Risk" simply because of insufficient input data.

The method 900 is an extension of the OAO service to an online application origination to single-page flows or across one or more multi-webpage flows. Specifically, the method 900 includes the fraud prevention server 135 determining whether the OAO service is enabled (at decision block 902). In response to determining that the OAO service is not enabled ("No" at decision block 902), the method 900 includes the fraud prevention server 135 again determining whether the OAO service is enabled (at decision block 902).

However, in response to determining that the OAO service is enabled ("Yes" at decision block 902), the method 900 includes the fraud prevention server 135 determining whether the website configuration includes a list of multi-page placements for the online application (at decision block 904). In response to determining that the website configuration does not include the list of multi-page placements for the online application ("No" at decision block 904), the method 900 includes the fraud prevention server 135 determining a fraud risk score of an online application origination based on the OAO model and on single-page input data (at block 906). As explained above, the fraud risk score differentiates between behavior of a normal user and behavior of a nefarious actor during the submission of the online application on a device.

However, in response to determining that the website configuration includes the list of multi-page placements for the online application ("Yes" at decision block 904), the method 900 includes the fraud prevention server 135 determining that input data needs to be stored in the memory 220 and combined into multi-page input data (at block 908). For example, the fraud prevention server 135 calculates the input data on a per page basis and stores the input data that is calculated as flow session records in the memory 220. The flow session records may be identified as one or more of a Statically defined Website Identifier, a Webpage name (typically client defined), a statically defined end user session identifier, a Placement Name, a Placement Page, a Session ID, and a Flow ID. The flow session TTL should also be the same as the SOB session. Further, the fraud prevention server 135 retrieves flow session records associated with a specific webpage placement that is configured as a multi-page flow from the memory 220 and combines the flow sessions records that are retrieved to generate the multi-page input data.

The method 900 also includes the fraud prevention server 135 determining a score of an online application origination based on the OAO model and at least in part on the multi-page input data that is generated (at block 910).

Figure 10:
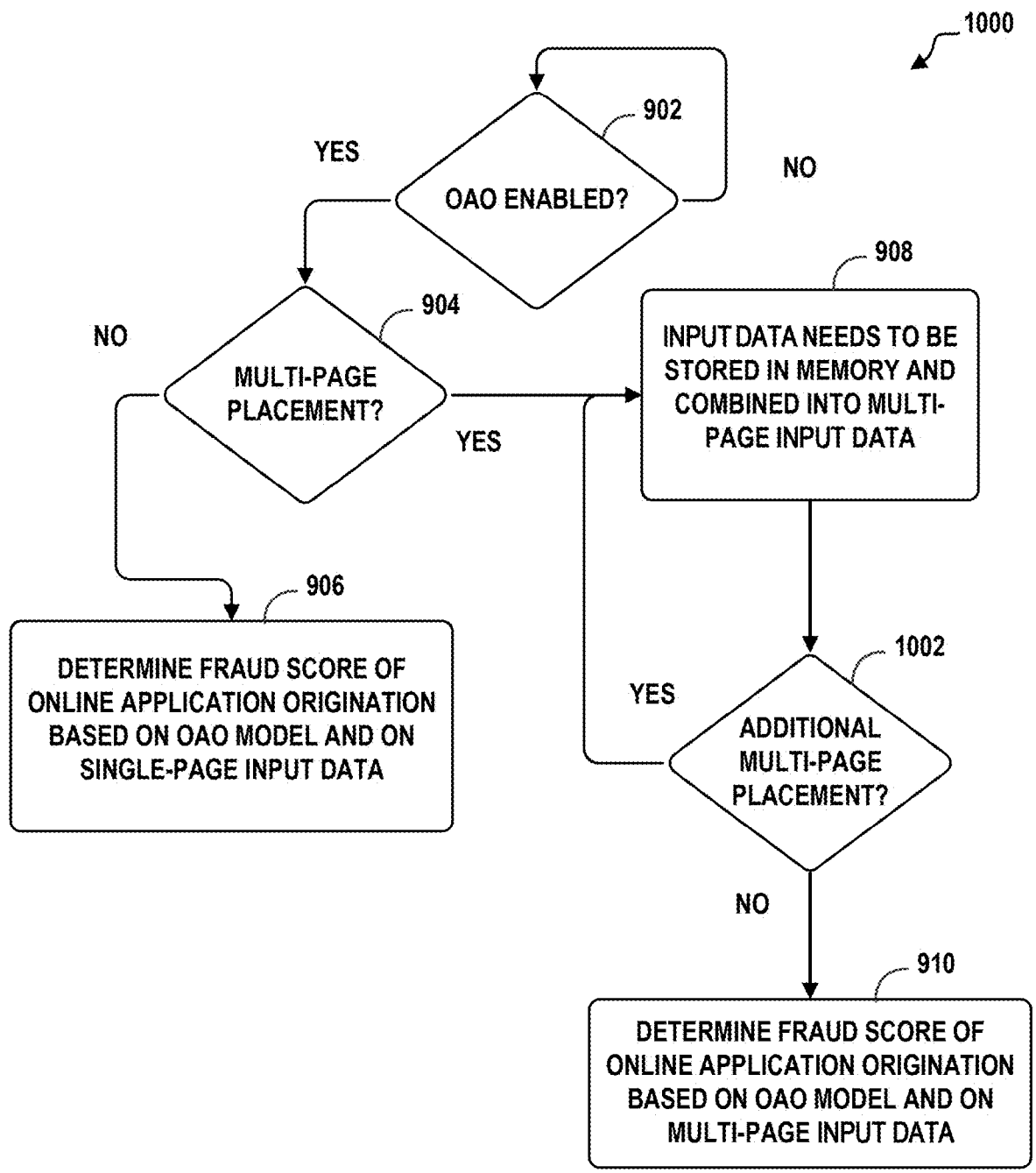
FIG. 10 is a flowchart that illustrates a second method for performing the OAO service for an online application that includes multiple online webpages, according to embodiments described herein.

FIG. 10 is a flowchart that illustrates a second method 1000 for performing the OAO service for an online application that includes multiple online webpages. The method 1000 is described with respect to the fraud prevention server 135 of FIGS. 1 and 2 and includes the method 900 of FIG. 9.

In addition to the method 900 of FIG. 9, the method 1000 also includes the fraud prevention server 135 determining whether the website configuration includes an additional specific webpage placement that is configured as a multi-page flow (at decision block 1002). In response to determining that the website configuration includes the additional specific webpage placement that is configured as a multi-page flow ("Yes" at decision block 1002), the method 1000 includes the fraud prevention server 135 determining that an additional set of the input data needs to be stored in the memory 220 and combined into the multi-page input data (at block 908).

In response to determining that the website configuration does not include any additional specific webpage placement that is configured as a multi-page flow ("No" at decision block 1002), the method 1000 includes the fraud prevention server 135 determining a score of an online application origination based on the OAO model and at least in part on the multi-page input data that is generated (at block 910).

Figure 11:
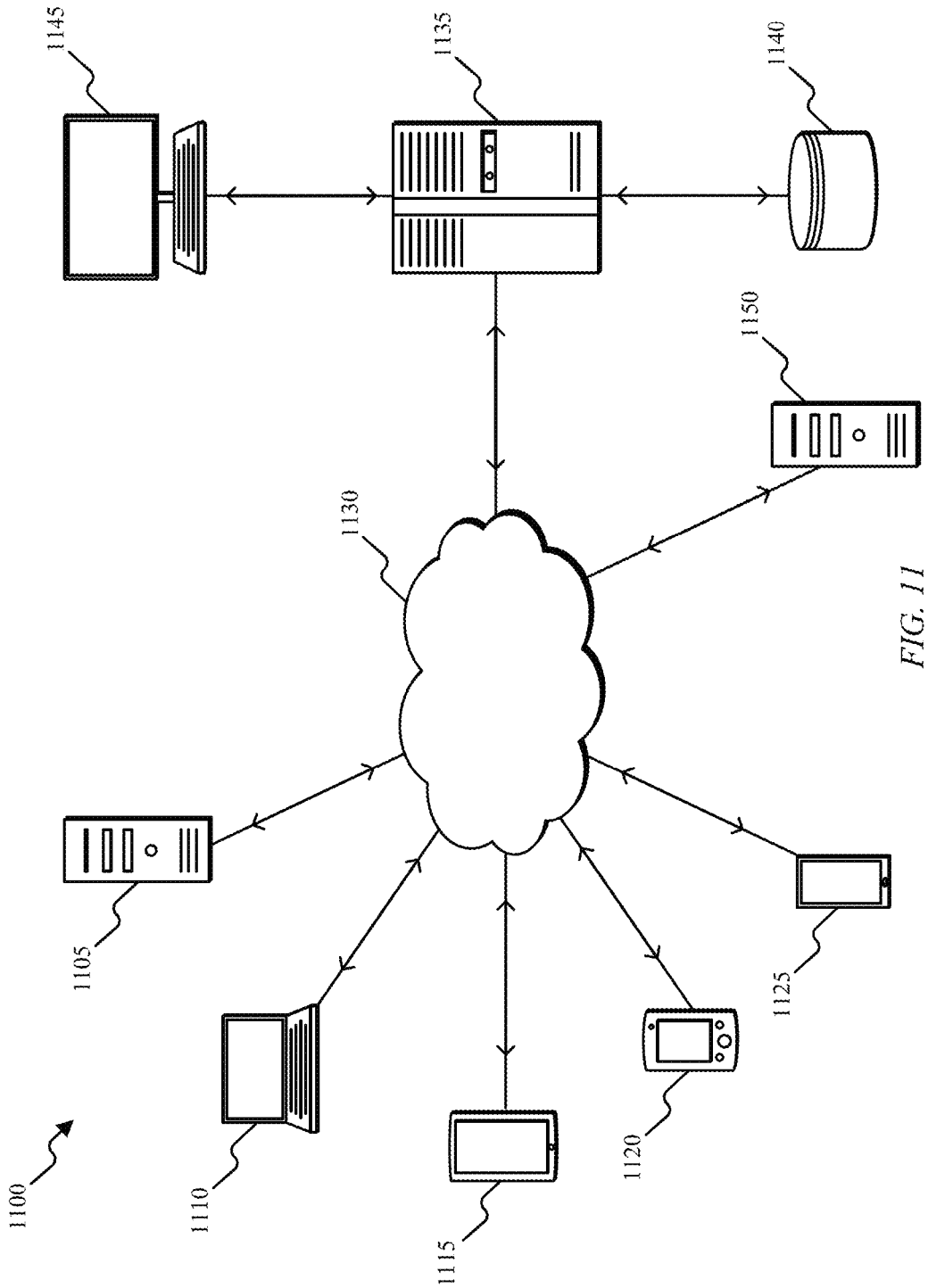
FIG. 11 is a diagram that illustrates a second system with feature drift hardening of an OAO model, according to embodiments described herein.

FIG. 11 is a diagram that illustrates a second system 1100 with feature drift hardening of an OAO model, according to embodiments described herein. The system 1100 includes a plurality of user devices 1105-1125, a network 1130, a server 1135, a database 1140, a server-side user interface 1145 (e.g., a workstation), and a client server 1150. The plurality of user devices 1105-1125, the network 1130, the fraud prevention server 1135, the database 1140, the server-side user interface 1145 (e.g., a workstation), and the client server 1150 are similar to the plurality of user devices 105-125, the network 130, the fraud prevention server 135, the database 140, the server-side user interface 145 (e.g., a workstation), and the client server 150 as described above with respect to FIG. 1. Consequently, redundant descriptions of these devices and components are not repeated herein.

Compared to the fraud prevention server 135, the fraud prevention server 1135 also includes an OAO feature-drift hardening program as described in greater detail below. In some examples, the feature-drift hardening program includes one method to manage the feature drift of the OAO model via an OAO model retraining process. In particular, the observation of feature drift in the OAO model triggers an alert subsystem. An alert is then used to notify OAO model owners that retraining activity is required. Retraining of the OAO model may be performed manually or automatically. Following retraining, an OAO model candidate may be promoted for use as a replacement to the previous OAO model.

In some embodiments, retraining of a live machine learning service requires an ongoing supply of labeled data. This may be achieved via processes such as manual or automated data provision, or through approaches such as semi-supervised learning.

Following retraining, the OAO model may be retrained to learn new feature distributions. This retraining method suffers from limitations. Firstly, this retraining method is dependent on an ongoing supply of labeled data, which may not be available in sufficient volume. Secondly, this retraining method is reactive, rather than adaptive. Thirdly, this retraining method is not viable in any context where the OAO model is becoming degraded more quickly than sufficient labeled data to train a new OAO model is collected; in such contexts the retrained OAO model will always remain at least somewhat degraded. Finally, this retraining method is vulnerable to rapid changes or back-and-forth switches in context because this retraining method involves creating a new model variant to replace the preexisting model. In the context of OAO, real-world scenarios such as A/B testing, or successive new form deployments may cause repeated model performance degradations.

Another embodiment of feature drift hardening involves slightly complicating the statistical OAO model itself by adding weighted terms that describe the degree of drift or tolerable against that feature. These terms may be defined dynamically using data properties. In some embodiments, a weight may be used that is inversely proportional to the age of the data record, or alternatively to the age of the data record relative to the newest data record in a larger sample. This allows OAO model training to bias towards more heavily weighting recent records and less heavily weighting older records.

In some embodiments, techniques such as hyperparameter optimization may be additionally used to learn a weighting parameter whose purpose is to further modify dynamic weighting attributes, or in directly learn appropriate dynamic weight values. This is a means of enabling the discovery and application of accurate, nonlinear weighting functions.

In some embodiments, multiple machine learning models (where an individual model is one or more parallelized functions, e.g. an ensemble) are applied alongside one another in Champion Challenger deployments. These models are differently trained and will possess different dynamic weights or other hyperparameters. In situations where a monitoring system identifies model performance degradation, the monitoring system may automatically identify and promote a candidate model with reduced performance change, while deferring an immediate need for labeled training data.

The OAO feature-drift hardening program is a synthesis of these components with additional aspects that further increase OAO model longevity and reduce incorrect results and associated real-world effects. Firstly, the OAO feature drift mitigation leverages monitoring and alerting approaches as described above. Additionally, the OAO feature drift mitigation leverages multiple models working in parallel to evaluate incoming data—these models are subdivided into at least one champion and at least one challenger model. In some embodiments, champion models produce real-time or near real-time decision results, while challenger models produce results more slowly, potentially on a daily or hourly cadence. In some embodiments, multiple champion models may be deployed to evaluate data in parallel, in order to enable functionality such as model selection decision rules.

In the OAO feature-drift hardening program, feature-drift hardening involves learning drift and temporal components and applying these components as a weighting function and a model selection rule, respectively. This requires training models ('learners') to learn values for the following components: 1) Drift trend learner, 2) Short-term learner, and 3) Long-term learner.

In some embodiments, the models used to learn these values are simple linear or logistic regression algorithms, xgboost ensembles, or other suitable machine learning classification or regression model. The long-term model is trained to evaluate a set of data with a long time-frame, for example, three, six, or twelve months. The short-term model is trained to evaluate a set of data with a short time-frame, for example one day, one week, or one month. The long-term and short-term learners are trained to solve the feature drift in the OAO model, using data from different periods of time. The short and long-term learners learn short-term trends and long-term properties for a given feature set, while the drift trend learner learns the underlying feature drift trend.

The output of the drift trend learner may be applied against the long-term learner to modify the results of that long-term learner as described above. The drift trend learner is not applied against the short-term learner, as the long-term drift trend is not useful input to a shorter-term model. The output of the drift trend learner may be applied to the long-term learner as a weighting value, or as a direct input to the long-term learner model.

Figure 12:
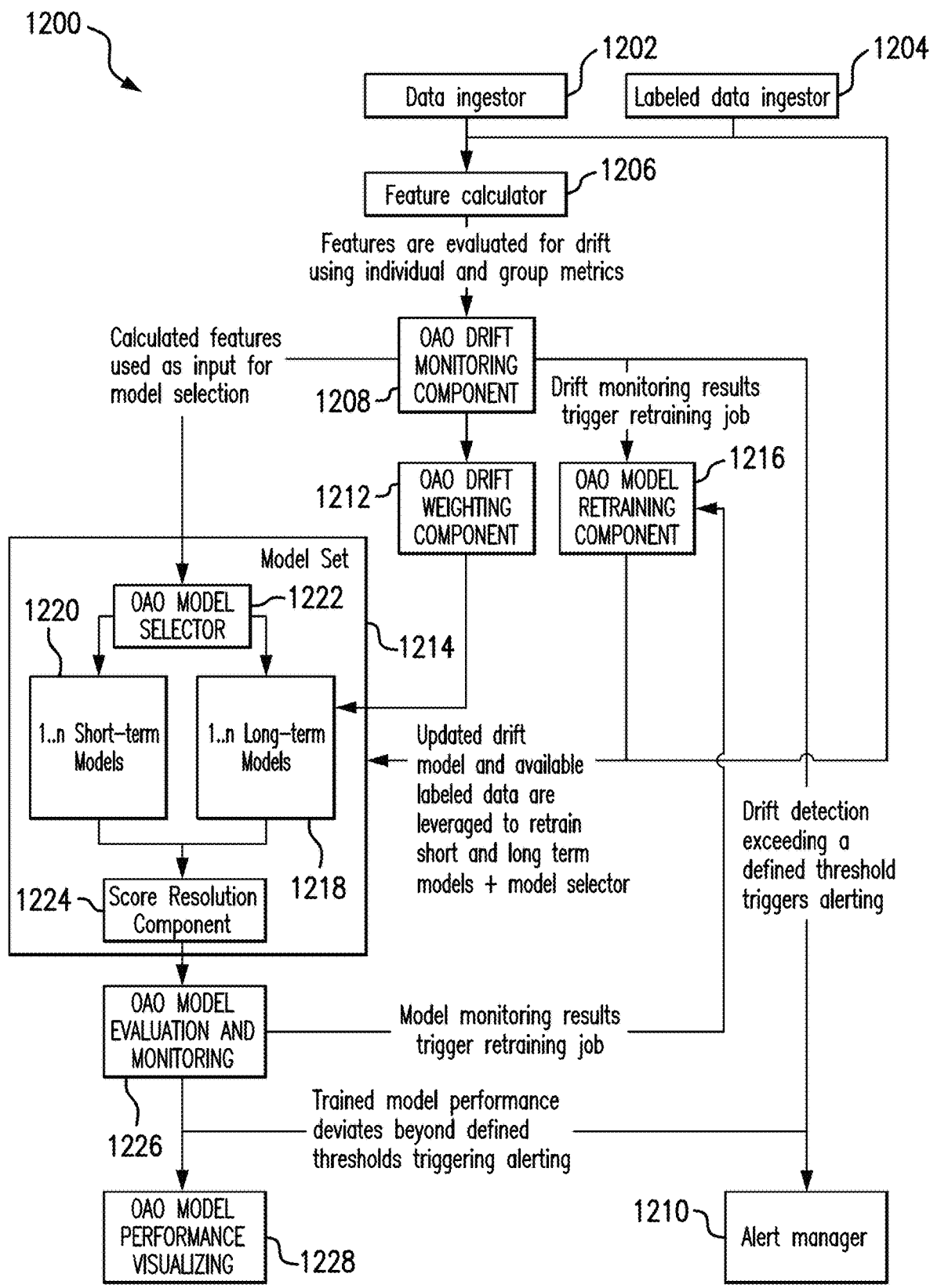
FIG. 12 is a flowchart that illustrates a feature drift hardening process, according to embodiments described herein.

FIG. 12 is a flowchart that illustrates an OAO feature drift hardening process 1200, according to embodiments described herein. FIG. 12 is described with respect to the fraud prevention server 1135 of FIG. 11. As illustrated in FIG. 12, the OAO feature drift hardening process 1200 includes the following software components: 1) a data ingestor 1202, 2) a labeled data ingestor 1204, 3) a feature calculator 1206, 4) an OAO drift monitoring component 1208, 5) an alerting component 1210, 6) an OAO drift weighting component 1212, 7) an OAO model set 1214, 8) an OAO model retraining component 1216, 9) longer-term models 1218, 10) shorter-term models 1220, 11) an OAO model selector 1222, 12) a score resolution component 1224, 13) an OAO model evaluation and monitoring component 1226, and 14) an OAO model output visualization component 1228 that are executable by the fraud prevention server 1135 or across one or more servers for distributed processing.

The data ingestor 1202 may be an arrangement of Extract-Transform-Load (ETL) software components (e.g. AWS Glue, Kinesis) that are used to transform and prepare incoming data for modeling. The labeled data ingestor 1204 may be an arrangement of Extract-Transform-Load (ETL) software components that are used to transform, validate and prepare client-provided labeled data. The labeled data tends to be more subject to data quality challenges than unlabeled telemetry, as it is human-generated and not subject to automated data quality validation tests.

The feature calculator 1206 may be a software module that is used to generate "features" (data input variables) for modeling. The OAO drift monitoring component 1208 may be a software module that measures the degree of feature drift across individual features and combinations of 2 . . . n features (where n is the total number of features in the set, for example, some or all of the behavioral features described above). These combinations may be problem specific or automatically defined (e.g., every combination of features may be assessed). The OAO drift monitoring component 1208 may also compare drift against a defined threshold and trigger an alert and retraining activity when the comparison determines that the drift exceeds a certain threshold.

The alerting component 1210 may be a software service that distributes alerts related to feature drift and model evaluation performance to relevant groups including individuals that maintain the models and users of the models. The OAO drift weighting component 1212 may be a software module that enables the setting of manually or automatically derived drift weights, such as event recency weights and the application of said weights as a feature within models. The OAO model set 1214 may be a collection of subcomponents including: 1) longer-term models 1218, intended to learn longer-term trends from mostly time-series features or alternatively to model drift components using a subset of information such as drift weighting and recency features, and 2) shorter-term models 1220, intended to learn short-term state from mostly stationary features without the impact of long-term drift.

The OAO model retraining component 1216 receives drift monitoring results from the OAO drift monitoring component 1208 and model monitoring results from the OAO model evaluation and monitoring component 1226. The OAO model retraining component 1216 outputs one or more retrained models to the OAO model set 1214 in response to determining that retraining is necessary based on at least one of the drift monitoring results or the model monitoring results.

The OAO model selector 1222 may be a mathematical function designed to select which OAO models to execute against a sample based on the observed drift of the sample. The score resolution component 1224 may be a software component designed to combine the scores from various OAO models into a single result. The combination of the scores from various OAO models into the single result may be achieved with a problem-specific regression function, or using ensemble resolution techniques such as stacking or bucketing.

The OAO model evaluation and monitoring component 1226 may be a software component designed to assess trained and live model performance through statistical evaluation, compare the results of evaluation to defined performance requirements, and trigger an alert when the comparison determines that the performance deviates from requirement thresholds. Lastly, the OAO model output visualization component 1228 may be designed to support analysis and model diagnostic activity by individuals that maintain the models or users of the models.

The fraud prevention server 1135 executes the data ingestor 1202 to ingest a dataset and executes the feature calculator 1206 to calculate feature values. The fraud prevention server 1135 executes the OAO drift monitoring component 1208 to evaluate these features values for degree of drift. The fraud prevention server 1135 executes the OAO drift weighting component 1212 to calculate a drift weight value for the dataset. The fraud prevention server 1135 stores the calculated feature values, the calculated drift value, and the drift weighting values in memory. In some embodiments, where the calculated drift value falls below a predefined threshold, the fraud prevention server 1135 may not store the calculated drift value in the memory, or may instead store a hard-coded replacement value, such as zero.

The fraud prevention server 1135 executes the OAO model selector 1222 to identify an OAO model of the OAO model set 1214 to execute against the dataset, producing separate scores for each individual model. The fraud prevention server 1135 executes the score resolution component 1224 to combine these scores into a single score, where the single score represents weighted evaluations of the input dataset considered through multiple time windows.

The fraud prevention server 1135 executes the OAO model evaluation and monitoring component 1226 to store the resulting score for this transaction in the memory, which retains a record of the model score information and transactional keys (e.g. transaction ID). The fraud prevention server 1135 executes the OAO drift monitoring component 1208 to calculate drift information and joins the drift information with the resulting score at the model retraining component 216, e.g., by joining on the transaction ID key to create a single data product. The fraud prevention server 1135 executes the OAO model output visualization component 1228 to visualize this data product for consumption by end users, including individuals responsible for maintaining the model, or users of the model.

When the fraud prevention server 1135 executes the OAO drift monitoring component 1208, the fraud prevention server 1135 may identify a higher degree of drift against a particular dataset. In response to identifying the higher degree of drift against the particular dataset, the fraud prevention server 1135 executes the OAO drift weighting component 1212 to calculate a drift weighting value may and use the drift weighting value as an input to any longer-term models 1218 to mitigate the impact of drift.

When the fraud prevention server 1135 executes the OAO drift weighting component 1212, the fraud prevention server 1135 may produce expected drift weightings for each dataset based on recency information, and optionally, based on a drift trend regression model projecting future drift from previous labeled records. The drift weightings are primarily used either as modifiers to the model result or as input features to long-term models 1218 directly, but may also be used as a means of supporting model selection by the OAO model selector 1222.

When the fraud prevention server 1135 executes the OAO model selector 1222, the fraud prevention server 1135 may optionally use the calculated drift value as an input to identify an appropriate subset of models to execute against the dataset, or else may use the calculated drift value as an input to identify a subset of models to execute against the dataset in real-time (with other models running in batch at a later date), or else may initialize all models against the dataset using parallel execution methods (e.g. transmission to trained model artifacts hosted in separate containers).

In some embodiments, labeled data is provided periodically at an agreed cadence (e.g., once per week, one per month, or some other period) by clients of the fraud prevention server 1135. In other embodiments, the fraud prevention server 1135 executes the model set component 1214 to infer the labeled data, such as a semi-supervised or unsupervised machine learning model. The fraud prevention server 1135 executes the OAO model evaluation and monitoring component 1226 to evaluate the scores produced by all of the datasets, and optionally subsets of the datasets, over a period of time which may be one hour, a day, a week or a larger temporal period.

The fraud prevention server 1135 executes the OAO model retraining component 1216 to consume information generated by the OAO drift and model monitoring components 1208 and 1226, and identify when a retraining of the model is necessary. This decision is based on statistical analysis of the output of the OAO model evaluation and monitoring component 1226. Model retraining may be initiated when either model score distribution (e.g. score central tendency, proportion of traffic identified as high risk) begins to deviate beyond accepted levels, when the fraud prevention server 1135 executes the OAO drift monitoring component 1208 and identifies a consistently higher degree of drift, or when a defined period of time has passed (e.g., one week, one month, three months, or some other temporal period). In addition, model retraining may also be manually initiated.

Model retraining leverages any available labeled data and calculated features for a set of recent datasets and creates new versions of both short-term models 1220 and long-term models 1218. The model retraining process includes the fraud prevention server 1135 evaluating model candidates and the fraud prevention server 1135 creating artifacts which may be deployed into production to act as short-term models 1220 and long-term models 1218. The fraud prevention server 1135 may also redefine the selection functions and parameters (e.g. thresholds for selection of specific models) of the OAO model selector 1222 based on the retraining configuration. In some embodiments, the fraud prevention server 1135 may also redefine the number of short-term models 1220 or long term models 1218 and the duration of data provided to each model based on the retraining configuration.

In some examples, the client server 1150 may be a server of a resource provider. For example, the client server 1150 is a bank server that provides a credit card to a user that establishes an account with the bank by performing an online application origination (e.g., filling out a form, either as part or all of what is required to establish an account with a credit card application). The remainder of the disclosure refers to a "credit card" as the resource that is provided by the resource provider. However, any resource that is available by an online application origination may be considered in place of the "credit card" as described herein.

Nefarious actors tend to display a familiarity with, e.g., form content and technological fluency that allows them to complete forms quickly, surely and by leveraging technological tricks and shortcuts. The OAO service monitors dozens of attributes related to typing speed and cadence, fluency of field navigation, shortcut use and form familiarity (expressed through such behaviors as skipping optional fields and avoiding form completion errors). The OAO service evaluates a range of directness, exploratory and detail-checking behaviors that differ significantly between good and nefarious actors.

However, as described above with respect to feature drifting, the behavioral aspects associated with nefarious actors will change as online application environment changes over time. For example, browser changes, website changes, improved autofill, or other suitable online application environment changes will cause "feature drift" because the behavioral aspects originally associated with nefarious actors will no longer accurately distinguish nefarious actors from good actors.

Figure 13:
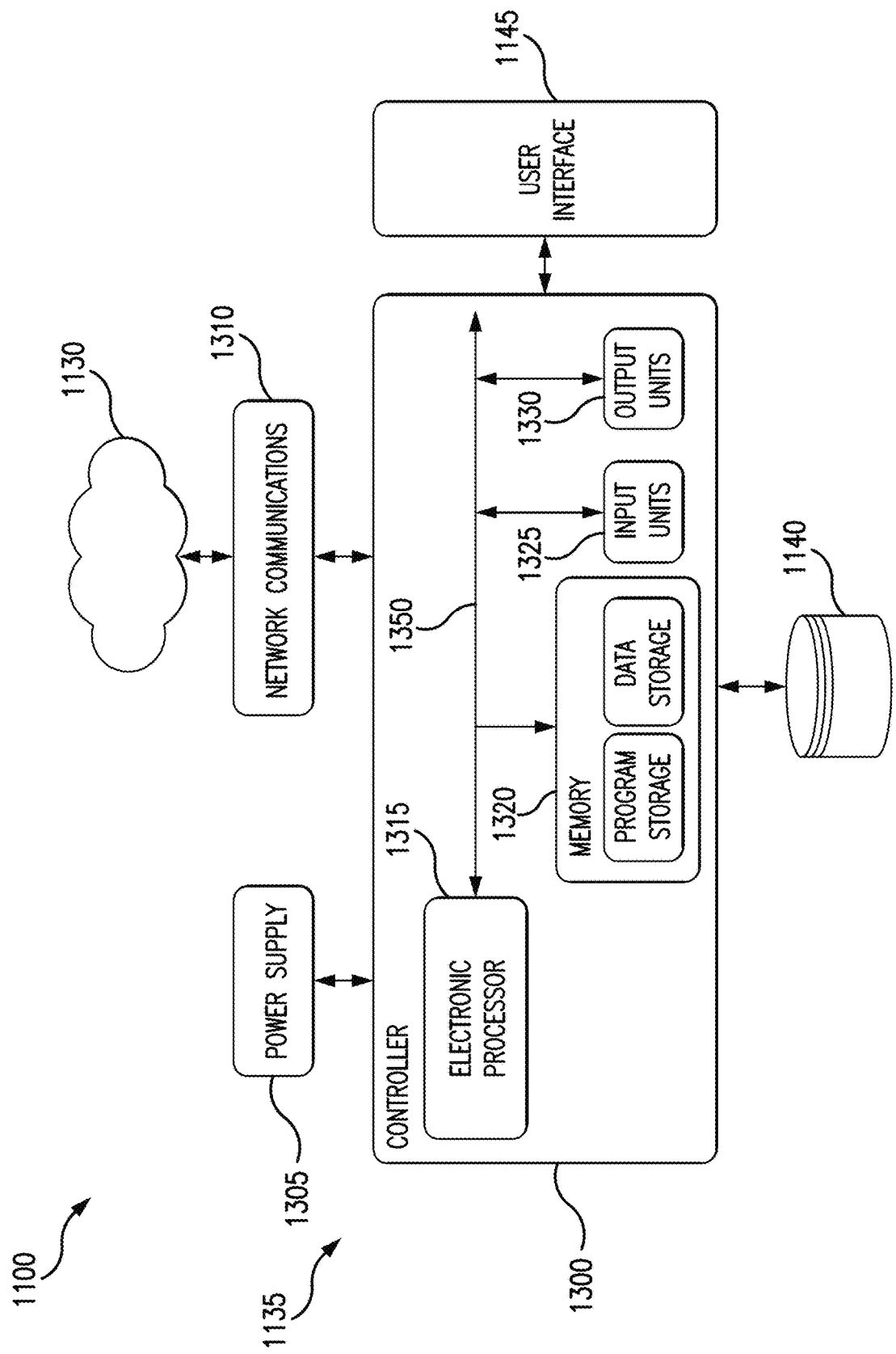
FIG. 13 is a block diagram that illustrates a server of the system of FIG. 11, according to embodiments described herein.

FIG. 13 is a block diagram that illustrates the fraud prevention server 1135 of the system 1100 of FIG. 11. The controller 1300, the power supply module 1305, and the network communications module 1310 of the fraud prevention server 1135 are similar to the controller 200, the power supply module 205, and the network communications module 210 of the fraud prevention server 135 as described with respect to FIG. 2. Consequently, redundant descriptions of the various components of the fraud prevention server 1135 are not repeated herein.

In some examples, the program storage area of the memory 1320 may store the instructions regarding the feature drift hardening program (referred to herein as "feature drift hardening") as described herein as well as the feature drift hardened OAO service as described in greater detail below.

The electronic processor 1315 executes machine-readable instructions stored in the memory 1320. For example, the electronic processor 1315 may execute instructions stored in the memory 1320 to perform the functionality of the feature drift hardening as described above.

In some examples, one implementation of the machine learning is to extract the statistical function learned by the fraud prevention server 1135 and deploy the statistical function as a lightweight endpoint (i.e., a first OAO model) on the fraud prevention server 1135. The fraud prevention server 1135 may call the OAO model with a real data sample to obtain an immediate prediction. This is typically done using an application container, e.g., using the Docker technology.

Additionally, in these examples, the fraud prevention server 1135 may slightly expand the statistical function (as described with respect to the drift weighting component 212), as a whole, and deploy the statistical function as a feature drift hardened OAO model on the fraud prevention server 1135. By slightly expanding the statistical function as a whole, the fraud prevention server 1135 reduces the OAO model's sensitivity to feature drift over time in its entirety.

In other examples, another implementation of the machine learning is to extract the statistical function learned by the fraud prevention server 1135 and deploy the statistical function as a rule in a larger online application service on the fraud prevention server 1135. This implementation executes the OAO service as a rule alongside other rules (for example, alongside the rules described below), folding the OAO model (i.e., the statistical function) neatly into a larger online application service.

Additionally, in these examples, the fraud prevention server 1135 may slightly expand the statistical function, in part, with respect to rules associated with features that have the highest likelihood of feature drift and deploy the statistical function as a feature drift hardened OAO model on the fraud prevention server 1135. By slightly expanding the statistical function in part, the fraud prevention server 1135 reduces the OAO model's sensitivity to feature drift over time with respect to rules associated with features that have the highest likelihood of feature drift to ensure better accuracy than expanding the statistical function as a whole.

The fraud prevention server 1135 is configured to perform the OAO service to evaluate how fields have been completed, evaluating a broad set of attributes that enable the model to distinguish between benign autofill and scripted form completion. By looking at fields that are challenging to autofill, the fraud prevention server 1135 is able to separate autofill from scripted automation by detecting the effectiveness of form-specific scripted solutions. Similarly, the fraud prevention server 1135 separates good users and nefarious actors by differentiating their behavior, for example, by detecting common manual fraud approaches (e.g., copy-paste) and even assessing user familiarity with the data in highly memorable fields (e.g., a Full Name field and a Phone Number field). This assessment of user familiarity is based on how encrypted data is entered into the highly memorable fields. The OAO service does not receive or process any of the encrypted data that is entered into the various fields.

The following data points are an illustrative subset of the data that may be used by the fraud prevention server 1135 in performing the OAO service to detect fraudulent behavior (and consequently, application risk): 1) cadence of completing the form, 2) method of moving through the form (click or tab), 3) progression through the form, 4) field order and 'circle back' behavior, 5) cadence and speed of user typing, 6) form focus and window-switching behavior, 7) detail-checking, and pausing behavior, 7) dynamics of mouse and touch interactions, 8) device orientation and accelerometer, 9) form field autocomplete or copy-paste behavior, and 10) familiarity with the form, e.g., omission of optional fields and error incidence rate.

However, the above data points may change over time as the online environment changes. For example, various browser features (e.g., autofill or other form completion features) may increase in speed or efficiency over time, which causes the above data points to be less accurate over time (referred to herein as "feature drift"). To reduce the sensitivity to this "feature drift," the OAO service may be subject to feature drift hardening, which directs some or all of the above data points to slightly expand (e.g., toward increasing in speed or efficiency) over time to compensate for the inherent increases in speed or efficiency over time in the online environment.

The OAO service executed by the fraud prevention server 1135 includes an OAO model that is hardened by feature drift. In some embodiments, the fraud prevention server 1135 receives a dataset of fraudulent applications (e.g., hundreds or thousands of example fraudulent applications) and uses the machine learning to output an OAO model that accounts for the various fraudulent aspects of the dataset as set forth in the feature set below for the present and the future. The fraud prevention server 1135 may then use the OAO model that is generated by machine learning to perform advanced classifications and generate a "Fraud Risk" score against application attempts in real-time and over a longer time horizon.

Figure 14:
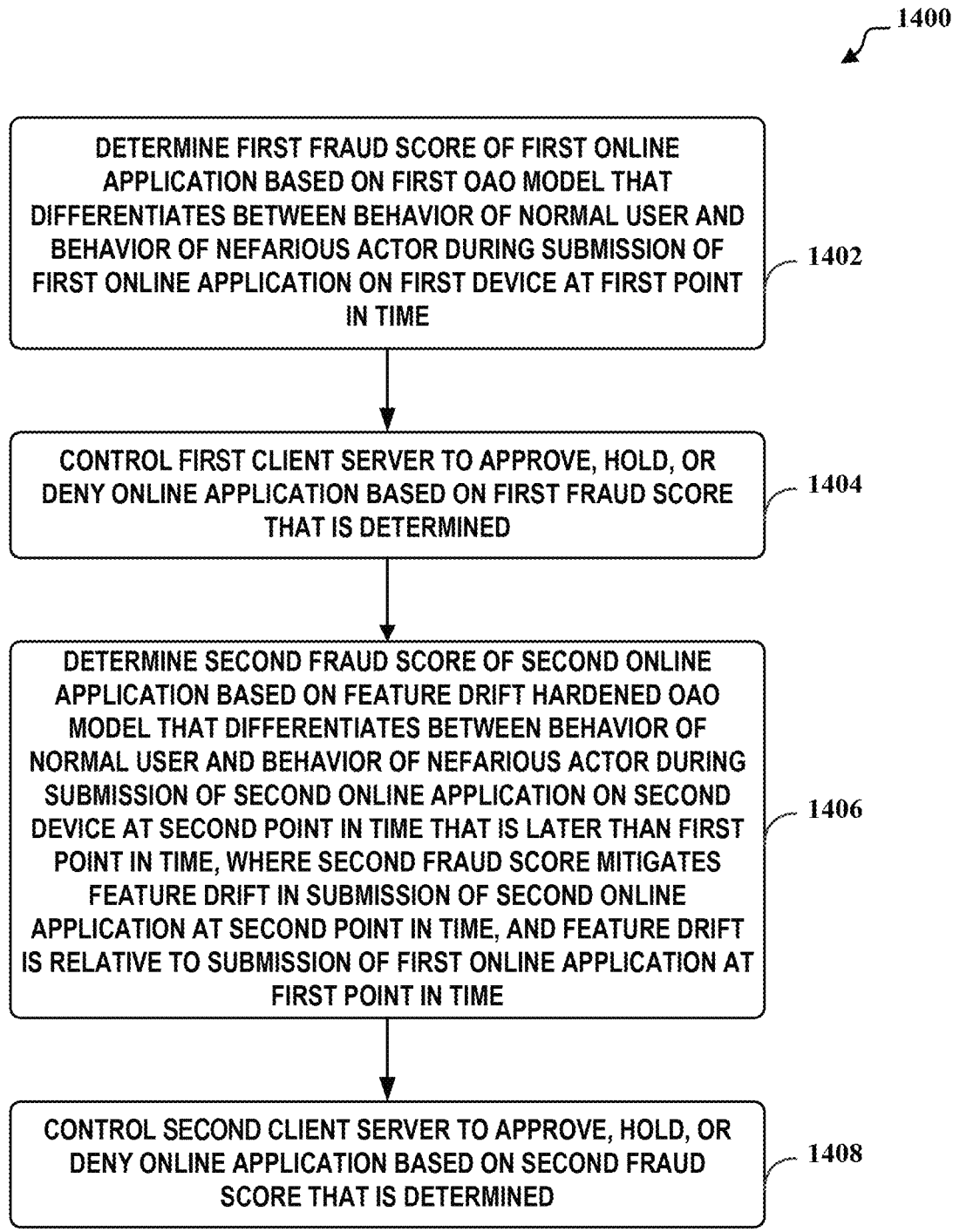
FIG. 14 is a flowchart that illustrates a method for performing a feature drift hardened OAO service to evaluate a user's behavior while opening an online account, according to embodiments described herein.

FIG. 14 is a flowchart that illustrates a method 1400 for performing a feature-drift hardened OAO service to evaluate a user's behavior while opening an online account, according to embodiments described herein. The method 1400 is described with respect to the fraud prevention server 1135 of FIGS. 11 and 13.

The method 1400 includes determining, with a feature drift hardened online application origination (OAO) service on a fraud prevention server, a first fraud risk score of a first online application based on a first OAO model that differentiates between a behavior of a normal user and a behavior of a nefarious actor during a submission of the first online application on a first device at a first point in time (at block 1402). For example, the fraud prevention server 1135 may calculate a first "Fraud Risk" score in real-time or near real-time with a first OAO model, which may be used as a real-time actionable assessment (e.g., "High Risk," "Moderate Risk," or "Low Risk") based on configurable thresholds assigned to a specific customer.

The method 1400 includes controlling, with the fraud prevention server, a first client server to approve, hold, or deny the online application based on the first fraud risk score that is determined (at block 1404).

The method 1400 includes determining, with the feature drift hardened OAO service on the fraud prevention server, a second fraud risk score of a second online application based on a feature drift hardened OAO model that differentiates between the behavior of the normal user and the behavior of the nefarious actor during a submission of the second online application on a second device at a second point in time that is later than the first point in time, the second fraud risk score mitigating the feature drift in the submission of the second online application at the second point in time, and the feature drift is relative to the submission of the first online application at the first point in time (at block 1406). For example, the feature drift may be an increase in speed or efficiency of the second online application at the second point in time relative to the submission of the first online application at the first point in time.

The method 1400 includes controlling, with the fraud prevention server, a second client server to approve, hold, or deny the second online application based on the second fraud risk score that is determined (at block 1408). In some examples, the second client server may be the same server as the first client server. In other examples, the second client server may be a different server than the first client server.

The following are enumerated examples of fraud prevention systems, methods for operating a fraud prevention system, and non-transitory computer-readable media. Example 1: A fraud prevention system comprising: a fraud prevention server including an electronic processor and a memory, the memory including an online application origination (OAO) service, wherein, when executing the OAO service, the electronic processor is configured to determine whether the OAO service is enabled, determine whether a website configuration includes a list of multi-page placements for an online application, determine that input data needs to be stored in the memory and combined into multi-page input data in response to determining that the OAO service is enabled and that the website configuration includes the list of multi-page placements for the online application, determine a fraud risk score of the online application based on the multi-page input data and an online application origination (OAO) model that differentiates between a behavior of a normal user and a behavior of a nefarious actor during a submission of the online application on a device, and control a client server to approve, hold, or deny the online application based on the fraud risk score that is determined.

Example 2

The fraud prevention system of Example 1, wherein the electronic processor is further configured to determine whether the website configuration includes an additional specific webpage placement that is configured as multi-page flow, and determine that an additional set of input data needs to be stored in the memory and combined into the multipage input data in response to determining that the website configuration includes the additional specific webpage placement that is configured as the multi-page flow.

Example 3

The fraud prevention system of Examples 1 or 2, wherein the OAO model includes a feature set with mouse movement behavioral features, and wherein the mouse movement behavioral features include a standard deviation of a mouse click in a X direction feature.

Example 4

The fraud prevention system of any of Examples 1-3, wherein the OAO model includes a feature set with navigation behavioral features, and wherein the navigation behavioral features further include a time from last key to submission feature.

Example 5

The fraud prevention system of any of Examples 1-4, wherein the OAO model includes a feature set with navigation behavioral features, and wherein the navigation behavioral features further include a coefficient of variation of keystroke rate across all fields in a form of the online application feature.

Example 6

The fraud prevention system of any of Examples 1-5, wherein the OAO model includes a feature set with mouse movement behavioral features, and wherein the mouse movement behavioral features further include a standard deviation of a mouse click in a Y direction feature.

Example 7

The fraud prevention system of any of Examples 1-6, wherein the OAO model includes a feature set with navigation behavioral features, and wherein the navigation behavioral features further include an average number of mouse clicks per field of the form feature.

Example 8

The fraud prevention system of any of Examples 1-7, wherein the OAO model includes a feature set with navigation behavioral features, and wherein the navigation behavioral features further include an amount of time on page feature.

Example 9

The fraud prevention system of any of Examples 1-8, wherein the OAO model includes a feature set with mouse movement behavioral features, and wherein the mouse movement behavioral features further include a total mouse distance feature.

Example 10

The fraud prevention system of any of Examples 1-9, wherein the OAO model includes a feature set with navigation behavioral features, and wherein the navigation behavioral features further include a ratio of time spent in fields of the form to the overall time on page feature.

Example 11

The fraud prevention system of any of Examples 1-10, wherein the OAO model includes a feature set with navigation behavioral features, and wherein the navigation behavioral features further include an average keystroke rate standard deviation feature.

Example 12

The fraud prevention system of any of Examples 1-11, wherein the OAO model includes a feature set with navigation behavioral features, and wherein the navigation behavioral features further include an average of time between focus and first keystroke feature.

Example 13

The fraud prevention system of any of Examples 1-12, wherein the OAO model includes a feature set with navigation behavioral features, and wherein the navigation behavioral features further include a total mouse click count feature.

Example 14

The fraud prevention system of any of Examples 1-13, wherein the OAO model includes a feature set with non-behavioral features.

Example 15

The fraud prevention system of Example 14, wherein the non-behavioral features further include a proxy concealed detection feature. Example 16: A method for operating a fraud prevention system, the method comprising: determining, with an electronic processor of a fraud prevention server, whether an online application origination (OAO) service is enabled; determining, with the electronic processor, whether a website configuration includes a list of multi-page placements for an online application; determining, with the electronic processor, that input data needs to be stored in the memory and combined into multi-page input data in response to determining that the OAO service is enabled and that the website configuration includes the list of multi-page placements for the online application; determining, with the electronic processor, a fraud risk score of the online application based on the multi-page input data and an online application origination (OAO) model that differentiates between a behavior of a normal user and a behavior of a nefarious actor during a submission of the online application on a device; and controlling, with the electronic processor, a client server to approve, hold, or deny the online application based on the fraud risk score that is determined.

Example 17

The method of Example 16, further comprising: determining, with the electronic processor, whether the website configuration includes an additional specific webpage placement that is configured as multi-page flow, and determining, with the electronic processor, that an additional set of input data needs to be stored in the memory and combined into the multipage input data in response to determining that the website configuration includes the additional specific webpage placement that is configured as the multi-page flow.

Example 18

The method of Example 17, wherein the OAO model includes a feature set with behavioral features, wherein the behavioral features include a standard deviation of a mouse click in a X direction feature.

Example 19

A non-transitory computer-readable medium comprising instructions that, when executed by a fraud prevention server, causes the fraud prevention server to perform a set of operations comprising: determining whether the OAO service is enabled, determining whether a website configuration includes a list of multi-page placements for an online application, determining that input profile record data needs to be stored in the memory and combined into multi-page input data in response to determining that the OAO service is enabled and that the website configuration includes the list of multi-page placements for the online application, determining a fraud risk score of the online application based on the multi-page input data and an online application origination (OAO) model that differentiates between a behavior of a normal user and a behavior of a nefarious actor during a submission of the online application on a device, and controlling a client server to approve, hold, or deny the online application based on the fraud risk score that is determined.

Example 20

The non-transitory computer-readable medium of Example 19, wherein the set of operations further includes determining whether the website configuration includes an additional specific webpage placement that is configured as multi-page flow, and determining that an additional set of input data needs to be stored in the memory and combined into the multipage input data in response to determining that the website configuration includes the additional specific webpage placement that is configured as the multi-page flow.

Thus, embodiments described herein provide, among other things, a multi-page online application origination (OAO) service for a fraud prevention system. Various features and advantages are set forth in the following claims.

What is claimed is:

1. A fraud prevention system for determining a fraudulent actor, the system comprising:
a fraud prevention server including an electronic processor and a memory, the memory including an online application origination (OAO) service,
wherein the OAO service is instructions that, when executed by the electronic processor, causes the electronic processor to perform a set of operations including
determining whether a first website configuration of a first online application has a multi-webpage flow;
responsive to determining that the first website configuration of the first online application does not have the multi-webpage flow, the set of operations further includes
calculating first input data on a single webpage of the first online application;

storing the first input data in the memory;
determining a first fraud risk score of the first online application based on the first input data and a first online application origination (OAO) model differentiating between a behavior of a first normal user and a behavior of a first actor during a submission of the first online application on a first device;
determining whether a second website configuration of a second online application has the multi-webpage flow;
responsive to determining that the second website configuration of the second online application has the multi-webpage flow, the set of operations further includes
calculating second input data on each webpage of a plurality of webpages of the second online application;
storing the second input data in the memory;
combining all of the second input data associated with a single session of the multi-webpage flow into multi-webpage input data;
storing the multi-webpage input data in the memory;
determining a second fraud risk score of the second online application based on the multi-webpage input data and a second online application origination (OAO) model differentiating between a behavior of a second normal user and a behavior of a second actor during a submission of the second online application on a second device; and
generating an approval signal, a hold signal, or a denial signal for the first online application or the second online application, based on the first fraud risk score or the second fraud risk score, respectively; and
transmitting the approval signal, the hold signal, or the denial signal for the first online application or the second online application to a client server.

2. The fraud prevention system of claim 1, wherein the second OAO model includes a feature set with mouse movement behavioral features, and wherein the mouse movement behavioral features include a standard deviation of a mouse click in an X direction feature.

3. The fraud prevention system of claim 1, wherein the second OAO model includes a feature set with navigation behavioral features, and wherein the navigation behavioral features further include a time from last key to submission feature.

4. The fraud prevention system of claim 1, wherein the second OAO model includes a feature set with navigation behavioral features, and wherein the navigation behavioral features further include a coefficient of variation of keystroke rate across all fields in a form of the second online application.

5. The fraud prevention system of claim 1, wherein the second OAO model includes a feature set with mouse movement behavioral features, and wherein the mouse movement behavioral features further include a standard deviation of a mouse click in a Y direction feature.

6. The fraud prevention system of claim 1, wherein the second OAO model includes a feature set with navigation behavioral features, and wherein the navigation behavioral features further include an average number of mouse clicks per field of a form feature.

7. The fraud prevention system of claim 1, wherein the second OAO model includes a feature set with navigation behavioral features, and wherein the navigation behavioral features further include an amount of time on page feature.

8. The fraud prevention system of claim 1, wherein the second OAO model includes a feature set with mouse movement behavioral features, and wherein the mouse movement behavioral features further include a total mouse distance feature.

9. The fraud prevention system of claim 1, wherein the second OAO model includes a feature set with navigation behavioral features, and wherein the navigation behavioral features further include a ratio of time spent in fields of a form to an overall time on page feature.

10. The fraud prevention system of claim 1, wherein the second OAO model includes a feature set with navigation behavioral features, and wherein the navigation behavioral features further include an average keystroke rate standard deviation feature.

11. The fraud prevention system of claim 1, wherein the second OAO model includes a feature set with navigation behavioral features, and wherein the navigation behavioral features further include an average of time between focus and first keystroke feature.

12. The fraud prevention system of claim 1, wherein the second OAO model includes a feature set with navigation behavioral features, and wherein the navigation behavioral features further include a total mouse click count feature.

13. The fraud prevention system of claim 1, wherein the second OAO model includes a feature set with non-behavioral features.

14. The fraud prevention system of claim 13, wherein the non-behavioral features further include a proxy concealed detection feature.

15. The fraud prevention system of claim 1, wherein transmitting the approval signal, the hold signal, or the denial signal for the first online application or the second online application to the client server further includes transmitting a control message to the client server, the control message controlling the client server.

16. The fraud prevention system of claim 1, wherein the set of operations further includes generating an approval signal, a hold signal, or a denial signal for the first online application based on the first fraud risk score;
generating a second approval signal, a second hold signal, or a second denial signal for the second online application based on the second fraud risk score; and
transmitting the second approval signal, the second hold signal, or the second denial signal for the second online application to a second client server.

17. A non-transitory computer-readable medium storing an online application origination (OAO) service for determining a fraudulent actor that, when executed by a processor in a fraud prevention server comprising a memory, causes the processor to perform a set of operations comprising:
determining whether a first website configuration of a first online application has a multi-webpage flow;
responsive to determining that the first website configuration of the first online application does not have the multi-webpage flow, the set of operations further includes calculating first input data on a single webpage of the first online application;
storing the first input data in a memory;
determining a first fraud risk score of the first online application based on the first input data and a first OAO model differentiating between a behavior of a first normal user and a behavior of a first actor during a submission of the first online application on a first device;

determining whether a second website configuration of a second online application has the multi-webpage flow;

responsive to determining that the second website configuration of the second online application has the multi-webpage flow, the set of operations further includes calculating second input data on each webpage of a plurality of webpages of the second online application;

storing the second input data in the memory;

combining all of the second input data associated with a single session of the multi-webpage flow into multi-webpage input data;

storing the multi-webpage input data in the memory;

determining a second fraud risk score of the second online application based on the multi-webpage input data and a second OAO model differentiating between a behavior of a second normal user and a behavior of a second actor during a submission of the second online application on a second device; and generating an approval signal, a hold signal, or a denial signal for the first online application or the second online application, based on the first fraud risk score or the second fraud risk score, respectively; and transmitting the approval signal, the hold signal, or the denial signal for the first online application or the second online application to a client server.

* * * * *